United States Patent
Miller et al.

(10) Patent No.: US 10,248,527 B1
(45) Date of Patent: Apr. 2, 2019

(54) AUTOMATED DEVICE-SPECIFIC DYNAMIC OPERATION MODIFICATIONS

(71) Applicant: Amplero, Inc., Seattle, WA (US)

(72) Inventors: Scott Allen Miller, Seattle, WA (US); Jesse Hersch, Seattle, WA (US); Luca Cazzanti, Seattle, WA (US); Oliver B. Downs, Seattle, WA (US)

(73) Assignee: Amplero, Inc, Seattle, WA (US)

( * ) Notice: Subject to any disclaimer, the term of this patent is extended or adjusted under 35 U.S.C. 154(b) by 0 days.

(21) Appl. No.: 16/136,035

(22) Filed: Sep. 19, 2018

(51) Int. Cl.
*G06F 11/30* (2006.01)
*G06F 11/34* (2006.01)
(Continued)

(52) U.S. Cl.
CPC ........ *G06F 11/3051* (2013.01); *G06F 1/3234* (2013.01); *G06F 9/44505* (2013.01); *G06F 11/3409* (2013.01); *G06F 11/3466* (2013.01)

(58) Field of Classification Search
CPC ............. G06F 11/3051; G06F 11/3466; G06F 9/44505; G06F 11/3409; G06F 1/3234
See application file for complete search history.

(56) References Cited

U.S. PATENT DOCUMENTS

| | | | |
|---|---|---|---|
| 4,829,426 A | 5/1989 | Burt | |
| 4,989,141 A | 1/1991 | Lyons et al. | |

(Continued)

FOREIGN PATENT DOCUMENTS

| | | |
|---|---|---|
| CN | 102118706 A | 7/2011 |
| EP | 1 197 433 A1 | 4/2002 |

(Continued)

OTHER PUBLICATIONS

"Bayesian Bandits—Surprise and Coincidence—Musings From the Long Tail," Feb. 8, 2012, retrieved from http://tdunning.blogspot.com/2012/02/bayesian-bandits.html, on Feb. 24, 2014, 3 pages.

(Continued)

*Primary Examiner* — Joseph E Dean, Jr.
(74) *Attorney, Agent, or Firm* — VLP Law Group LLP; James A.D. White

(57) ABSTRACT

Techniques are described for automatically and dynamically modifying ongoing operation of computing devices in device-specific manners, such as to improve ongoing performance of the computing devices by modifying configuration settings on the computing devices or on associated systems in communication with the computing devices. The techniques may include generating one or more decision structures that are each specific to a type of measured performance effect, and using the decision structure(s) to improve corresponding performance of a computing device, with the generating of the decision structure(s) including analyzing training data that associates prior measured performance effects with corresponding attributes of computing devices and of modification actions that were performed for the computing devices. Non-exclusive examples of modifying operation of a smartphone computing device include modifying configuration settings affecting use of one or more of the device's battery, memory, storage and network communications.

29 Claims, 10 Drawing Sheets

(51) Int. Cl.
*G06F 9/445* (2018.01)
*G06F 1/3234* (2019.01)

(56) References Cited

U.S. PATENT DOCUMENTS

| | | | |
|---|---|---|---|
| 5,182,793 A | 1/1993 | Alexander et al. |
| 5,287,270 A | 2/1994 | Hardy et al. |
| 5,325,290 A | 6/1994 | Cauffman et al. |
| 5,483,445 A | 1/1996 | Pickering |
| 5,521,364 A | 5/1996 | Kimura et al. |
| 5,537,314 A | 7/1996 | Kanter |
| 5,583,763 A | 12/1996 | Atcheson et al. |
| 5,655,085 A | 8/1997 | Ryan et al. |
| 5,684,963 A | 11/1997 | Clement |
| 5,684,965 A | 11/1997 | Pickering |
| 5,699,528 A | 12/1997 | Hogan |
| 5,765,144 A | 6/1998 | Larche et al. |
| 5,768,142 A | 6/1998 | Jacobs |
| 5,794,207 A | 8/1998 | Walker et al. |
| 5,802,502 A | 9/1998 | Gell et al. |
| 5,832,460 A | 11/1998 | Bednar et al. |
| 5,862,203 A | 1/1999 | Wulkan et al. |
| 5,873,071 A | 2/1999 | Ferstenberg et al. |
| 5,873,072 A | 2/1999 | Kight et al. |
| 5,897,621 A | 4/1999 | Boesch et al. |
| 5,915,006 A | 6/1999 | Jagadish et al. |
| 5,918,217 A | 6/1999 | Maggioncalda et al. |
| 5,920,848 A | 7/1999 | Schutzer et al. |
| 5,943,656 A | 8/1999 | Crooks et al. |
| 5,963,910 A | 10/1999 | Ulwick |
| 5,963,939 A | 10/1999 | McCann et al. |
| 5,970,130 A | 10/1999 | Katko |
| 5,978,280 A | 11/1999 | Saripella et al. |
| 5,978,780 A | 11/1999 | Watson |
| 5,987,434 A | 11/1999 | Libman |
| 5,991,310 A | 11/1999 | Katko |
| 5,991,739 A | 11/1999 | Cupps et al. |
| 6,009,411 A | 12/1999 | Kepecs |
| 6,012,051 A | 1/2000 | Sammon, Jr. et al. |
| 6,029,195 A | 2/2000 | Herz |
| 6,032,132 A | 2/2000 | Nelson |
| 6,035,025 A | 3/2000 | Hanson |
| 6,035,277 A | 3/2000 | Anbil et al. |
| 6,070,150 A | 5/2000 | Remington et al. |
| 6,076,080 A | 6/2000 | Morscheck et al. |
| 6,078,897 A | 6/2000 | Rubin et al. |
| 6,119,109 A | 9/2000 | Muratani et al. |
| 6,209,095 B1 | 3/2001 | Anderson et al. |
| 6,285,991 B1 | 9/2001 | Powar |
| 6,292,789 B1 | 9/2001 | Schutzer |
| 6,304,857 B1 | 10/2001 | Heindel et al. |
| 6,311,170 B1 | 10/2001 | Embrey |
| 6,313,833 B1 | 11/2001 | Knight |
| 6,360,211 B1 | 3/2002 | Anderson et al. |
| 6,397,193 B1 | 5/2002 | Walker et al. |
| 6,412,012 B1 | 6/2002 | Bieganski et al. |
| 6,463,585 B1 | 10/2002 | Hendricks et al. |
| 6,493,685 B1 | 12/2002 | Ensel et al. |
| 6,533,418 B1 | 3/2003 | Izumitani et al. |
| 6,578,015 B1 | 6/2003 | Haseltine et al. |
| 6,609,118 B1 | 8/2003 | Khedkar et al. |
| 6,614,781 B1 | 9/2003 | Elliott et al. |
| 6,745,229 B1 | 6/2004 | Gobin et al. |
| 6,839,687 B1 | 1/2005 | Dent et al. |
| 6,915,265 B1 | 7/2005 | Johnson |
| 6,968,319 B1 | 11/2005 | Remington et al. |
| 7,006,980 B1 | 2/2006 | Snyder |
| 7,136,821 B1 | 11/2006 | Kohavi et al. |
| 7,236,950 B2 | 6/2007 | Savage et al. |
| 7,430,531 B1 | 9/2008 | Snyder |
| 7,472,080 B2 | 12/2008 | Goel |
| 7,707,090 B2 | 4/2010 | Snyder |
| 7,711,606 B2 | 5/2010 | Snyder |
| 7,774,271 B1 | 8/2010 | Edwards et al. |
| 8,103,650 B1 | 1/2012 | Kauchak et al. |
| 10,055,516 B1* | 8/2018 | Abou-el-ella ........... G06F 11/00 |
| 2001/0032165 A1 | 10/2001 | Friend et al. |
| 2002/0013631 A1 | 1/2002 | Parunak et al. |
| 2002/0052803 A1 | 5/2002 | Amidhozour et al. |
| 2002/0171662 A1 | 11/2002 | Lee |
| 2002/0194117 A1 | 12/2002 | Nabe et al. |
| 2002/0198775 A1 | 12/2002 | Ryan |
| 2003/0088449 A1 | 5/2003 | Menninger |
| 2005/0096950 A1 | 5/2005 | Caplan et al. |
| 2005/0261987 A1 | 11/2005 | Bezos et al. |
| 2006/0178918 A1 | 8/2006 | Mikurak |
| 2006/0253309 A1 | 11/2006 | Ramsey et al. |
| 2007/0027744 A1 | 2/2007 | Carson et al. |
| 2007/0043615 A1 | 2/2007 | Dahleh et al. |
| 2008/0077471 A1 | 3/2008 | Musgrove et al. |
| 2008/0098379 A1* | 4/2008 | Newman ............ G06F 9/44505 717/168 |
| 2008/0162269 A1 | 7/2008 | Gilbert |
| 2008/0235611 A1* | 9/2008 | Fraley ................. G06F 9/44505 715/772 |
| 2008/0281790 A1 | 11/2008 | Prosser et al. |
| 2009/0254912 A1* | 10/2009 | Roundtree ................ G06F 8/61 718/102 |
| 2009/0299817 A1 | 12/2009 | Fok et al. |
| 2010/0010878 A1 | 1/2010 | Pinto et al. |
| 2010/0250477 A1 | 9/2010 | Yadav |
| 2010/0262487 A1 | 10/2010 | Edwards et al. |
| 2013/0246164 A1 | 9/2013 | Khanna |
| 2013/0305358 A1* | 11/2013 | Gathala ................... G06F 21/56 726/22 |
| 2013/0332260 A1 | 12/2013 | Cheng et al. |
| 2014/0074614 A1 | 3/2014 | Mehanian et al. |

FOREIGN PATENT DOCUMENTS

| | | |
|---|---|---|
| EP | 1 207 696 A1 | 5/2002 |
| JP | 11-85846 A | 3/1999 |
| JP | 11-292021 A | 10/1999 |
| JP | 2002-334280 A | 11/2002 |
| WO | 98/33104 A2 | 7/1998 |

OTHER PUBLICATIONS

Chickering et al., "Efficient Determination of Dynamic Split Points in a Decision Tree," Proceedings of the IEEE International Conference on Data Mining (ICDM 2001), Nov. 29-Dec. 2, 2001, San Jose, CA, 8 pages.

"A/B testing," retrieved from http://en.wikipedia.org/w/index.php?oldid=612109893, last visited on Jun. 20, 2014, 4 pages.

"Gamma distribution," retrieved from http://en.wikipedia.org/w/index.php?oldid=611502670, last visited on Jun. 20, 2014, 13 pages.

"An Overview of Electronic Bill Presentment and Payment Operating Models: Process, Roles, Communications, and Transaction Flows," Prepared by the Business Practices Task Force of NACHA's Council for Electronic Billing and Payment, Apr. 9, 1999, 14 pages.

Abekah et al., "Canadian Firms' Characteristics Vs. Their Position Towards Tightening Reporting Requirements of Extraordinary Accounting Items Classification," *Journal of Financial Management & Analysis 12*, Jul.-Dec. 1999, 12 pages.

"Edify Wins Strategy Award for Electronic Bill Payment and Presentment," ProQuest, PR Newswire, New York, Jun. 21, 1999, retrieved from http://proquest.umi.com/pqdweb?index=35&sid=5&srchmode=1&vinst=PROD&fmt=3&start . . . , on Jan. 7, 2010, 3 pages.

Krell, "The Unexpected Benefits of E-Billing," Business Finance, Mar. 2, 2000, retrieved from http://businessfinancemag.com/print/5355, on Dec. 30, 2010, 5 pages.

"Predictive analytics," Wikipedia, retrieved from http://en.wikipedia.org/wiki/Predictive_analytics, on Aug. 24, 2009, 11 pages.

"Cable & Wireless Improves Electronic Billing Nov. 26, 1991," Newbytes, Nov. 26, 1991, 2 pages.

Cohn, "There's a smarter search engine," ProQuest, Catalog Age, New Canaan, vol. 15, Iss. 4, pp. 93-94, Apr. 1, 1998, 4 pages.

(56) References Cited

OTHER PUBLICATIONS

U.S. Appl. No. 09/619,248, filed Jul. 19, 2000, 73 pages.
U.S. Appl. No. 11/382,230, filed May 8, 2006, 57 pages.
Freeman, "Keeping 'em happy," May 8, 2000, Marketing News v34n10 pp. 21, Dialog file 15, Accession No. 53388340, 3 pages.
Sweetland, "Integrating billing and the Internet," Telecommunications (International Edition) v31n6, Jun. 1997, 5 pages.

* cited by examiner

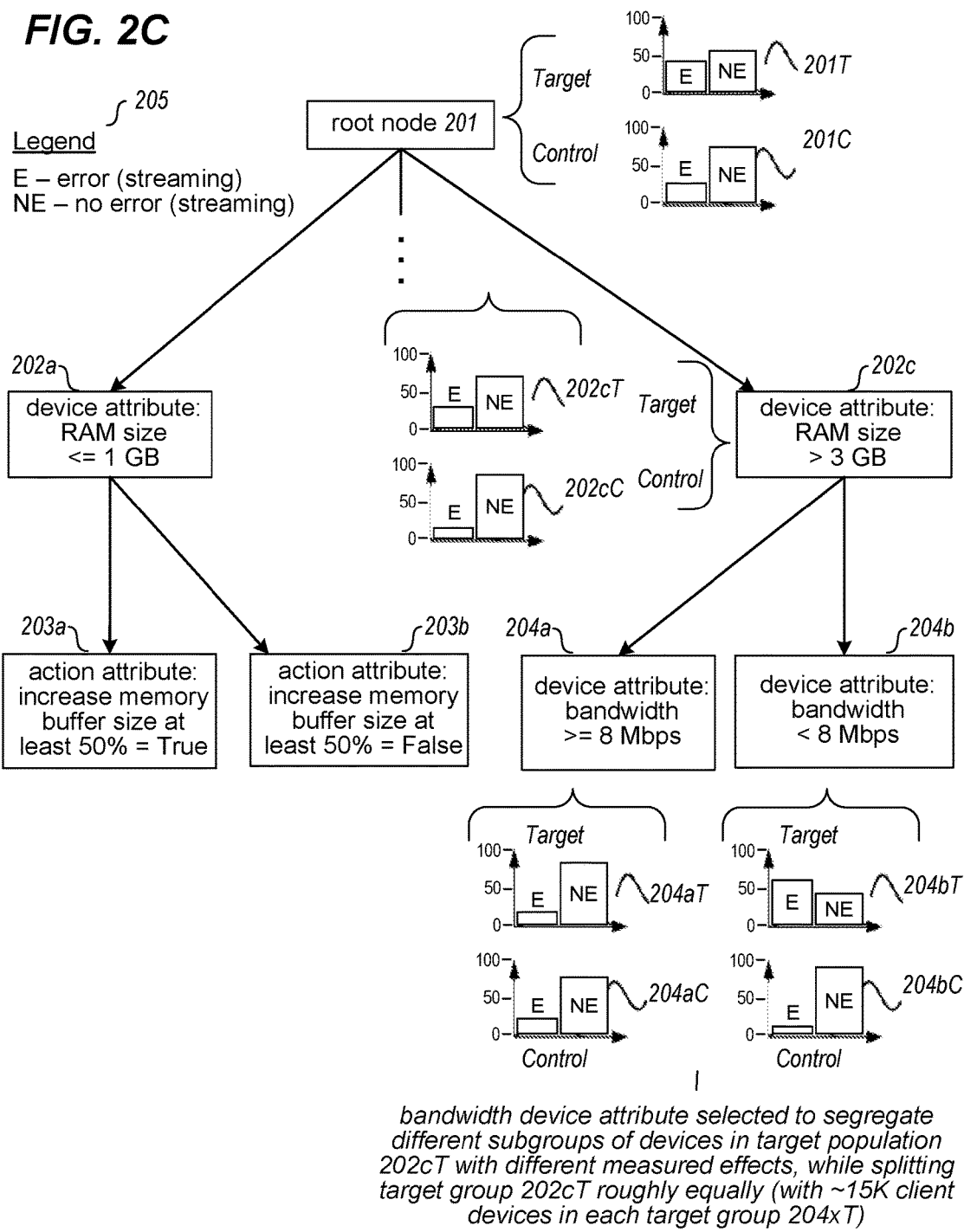

AUTOMATED DEVICE-SPECIFIC DYNAMIC OPERATION MODIFICATIONS

TECHNICAL FIELD

The following disclosure relates generally to automatically and dynamically modifying ongoing operation of computing devices in device-specific manners, such as to dynamically modify smartphone use of battery, memory, storage and network communications to improve system operation in one or more specified manners.

BACKGROUND

Operations of computing devices are increasingly complex, with a variety of configuration settings that affect device performance. For example, smartphones and other mobile computing devices often have settings that affect battery usage, such as in an inverse proportion to other activities that affect device performance, including use of memory, storage and network communications. Operations of related service providers, such as providers of telecom services or other network communication service, can also affect such device operation, including with respect to how network communications to and from such devices are managed. In addition, applications executing on a computing device can affect various aspects of device performance.

While attempts to configure and implement device operations may increase effectiveness of the devices in some situations if they are performed correctly, problems exist with existing techniques for such device operation management, including in balancing different aspects of the device operations.

BRIEF DESCRIPTION OF THE DRAWINGS

FIGS. 2A-2E are diagrams illustrating examples of generating and using a decision structure for dynamically and automatically modifying ongoing operation of computing devices in device-specific manners.

DETAILED DESCRIPTION

Figure 1:
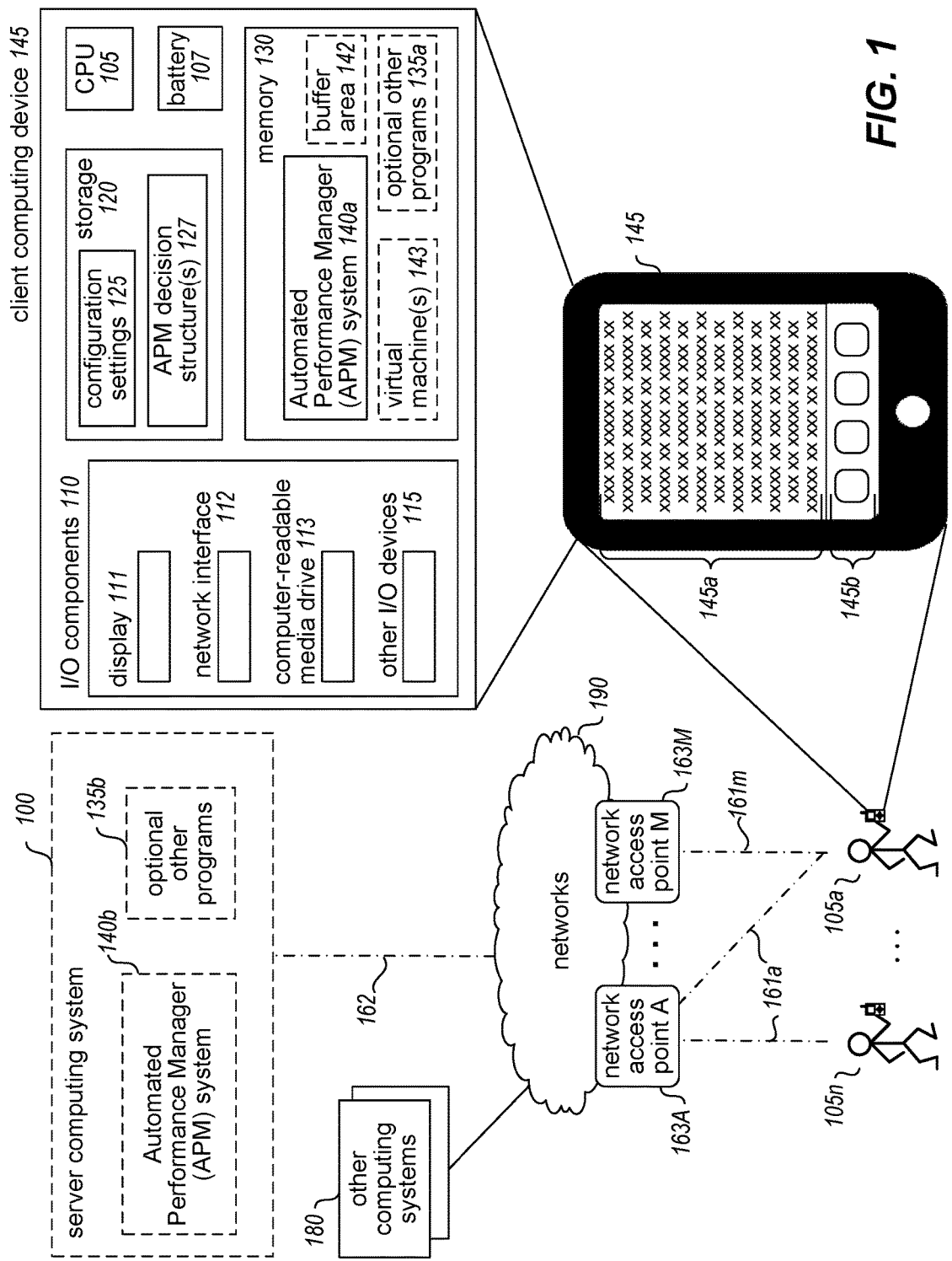
FIG. 1 is a network diagram illustrating an example environment in which a system is provided and used for automatically and dynamically modifying ongoing operation of computing devices in device-specific manners, including illustrating example computing systems suitable for executing an embodiment of such a system.

Techniques are described for automatically and dynamically modifying ongoing operation of computing devices in device-specific manners, such as to improve ongoing performance of the computing devices by modifying configuration settings on the computing devices or on associated systems in communication with the computing devices. In at least some embodiments, the techniques include generating one or more decision structures that are each specific to a type of measured performance effect, and using the decision structure(s) to improve corresponding performance of a computing device, with the generating of the decision structure(s) including analyzing training data that associates prior measured performance effects with corresponding attributes of computing devices and of modification actions that were performed for the computing devices. Non-exclusive examples of modifying operation of a smartphone computing device include modifying configuration settings affecting use of one or more of the device's battery, memory, storage and network communications, and non-exclusive examples of improving a measured performance effect on the computing device includes one or more of reducing communication errors or associated problems (e.g., network latency, network congestion, etc.), increasing the speed of application execution or associated computing operations (e.g., data access) on the computing device, increasing the length of battery life on the computing device, etc. In at least some embodiments, the described techniques are performed by automated operations of a computer-implemented Automated Performance Manager (APM) system, as discussed in greater detail below.

In at least some embodiments, the one or more decision structures are generated in a manner to address the combinatorics problem of potentially millions (or more) of combinations of different attributes that may affect device performance—as one non-exclusive example, a telecom service provider may be providing service to millions of smartphone computing devices, those computing devices (potentially of many different types and configurations) may have thousands of different device attributes (each with multiple possible values) that can potentially affect device performance, and the possible modification actions that can be performed to potentially affect performance on those computing nodes may have hundreds of different action attributes (each with multiple possible values). When faced with large numbers of such device attributes and action attributes, it may be impossible to computationally determine and store information for every combination of possible attribute values for even a single type of measured performance effect (e.g., with a range of the measured performance effects of that type being represented for each combination of attribute values), let alone to determine and store separate information of that type for each of multiple different types of measured performance effects.

Accordingly, in at least some embodiments, a decision structure is generated to include and represent only a subset of possible attributes, such as a small number of attributes that are associated with the largest changes in performance effects or that otherwise best differentiate which modification actions are of most benefit to which computing devices in particular situations. As discussed in greater detail below, in some embodiments an attribute is selected to be used in a particular situation based on it providing a highest statistical information gain relative to other possible attributes. Furthermore, a decision structure may have a variety of nodes (or other sub-structures), in some cases structured hierarchically, which each is associated with one or more attributes selected for the decision structure, and which has one or more associated groups of devices that have attributes corresponding to that node's attribute(s). The group(s) of devices associated with a node may come, for example, from a set of training data obtained for various client devices, and may further be separated at a node into a target group of devices for which one or more modification actions of interest were performed, and a control group of other devices for which those modification action(s) were not performed. The training data for the group(s) of devices associated with a node may further be analyzed to determine effects with respect to one or more performance measures of interest, such as to create a target distribution of the performance effects for the devices in the target group, and a control distribution of the performance effects for the devices in the control group. Accordingly, the target and control distributions associated with such a node may be used to predict the effect of performing a modification action on a client device being controlled that has attributes matching those associated with the node, such as based on a difference in the performance effects between the target and control distributions. Additional details related to a non-exclusive example of generating and using such a decision structure are included below with respect to FIGS. 2A-2E.

The described techniques may be used to improve a variety of types of device operations, based on a variety of types of device attributes and possible modification actions having corresponding action attributes. As noted above, non-exclusive examples of modifying operation of a smartphone computing device include modification actions to alter configuration settings affecting use of one or more of the device's hardware components (e.g., battery, memory, storage network interface, etc.), affecting use of the device's operating system functionality (e.g., use of virtualization, size of buffer space, etc.), affecting use of the device's executing programs (e.g., to shutdown, start, change version of or otherwise update, change priority or otherwise change operation), etc., and corresponding action attributes may include any measurable aspect of one or more such actions that can alter performance. Device attributes may analogously include any measurable aspect of a client device that can alter performance, including with respect to one or more hardware components, configuration settings (e.g., with respect to use of hardware components, use of an operating system, use of one or more application programs, etc.)—furthermore, in at least some embodiments, attributes of a device may include aspects of one or more users of the device if they can alter performance on the client device (e.g., corresponding to usage patterns or other user interactions with the device). Similarly, a performance measure and its resulting measured performance effects may include any aspect of device operation that can be measured and altered—furthermore, in at least some embodiments in which user aspects are included among the device attributes, measured performance effects may include behavioral aspects of device users that correspond to device operations. While various examples of device attributes, action attributes and performance measures/effects are included herein, it will be appreciated that the described techniques are not limited to these exemplary details.

The described techniques may provide a variety of benefits and advantages. Non-exclusive examples of such benefits and advantages include the following: improving operations of individual client computing devices and/or fleets or other groups of related client devices; performing automated analysis of training data to generate and/or adapt/update decision structures, including to reflect monitored actual performance of client devices; managing very large datasets of actual performance data, potentially for millions or more client devices and for multiple modification actions performed for each of some or all such devices; managing very large number of attributes and attribute combinations, potentially for millions or more such combinations; etc.

For illustrative purposes, some embodiments are described below in which specific types of operations are performed, including with respect to using the described techniques with particular types of client devices, device attributes, modification action attributes and/or types of measured performance effects. These examples are provided for illustrative purposes and are simplified for the sake of brevity, and the inventive techniques may be used in a wide variety of other situations, including with other types of automated decisions of which actions to perform in other types of settings, some of which are discussed below—accordingly, it will be appreciated that the described techniques are not limited to use with the example embodiments discussed below.

FIG. 1 is a network diagram illustrating an example environment in which a system is provided and used for dynamically and automatically modifying ongoing operation of computing devices in device-specific manners, including illustrating example computing systems suitable for executing an embodiment of such a system.

In particular, FIG. 1 illustrates example users 105 who each has a client computing device that has one or more types of wireless communication capabilities, such as smartphone computing devices or other mobile computing devices (e.g., a tablet, laptop, etc.), although in other embodiments some or all such client devices may be fixed-location devices and/or may not support wireless communications. The handheld client computing device 145 of example user 105a is illustrated in additional detail, such as to include a smartphone device or tablet device with a touch-sensitive display. In this example, the display is separated into sections 145a and 145b by a graphical user interface ("GUI") displayed on the device 145, with the portion 145b being used in this example to provide user-selectable functionality controls (e.g., buttons or icons), and the separate portion 145a being used to display or otherwise present various information to the user. It will be appreciated that in other embodiments a device may have other types of GUIs (or no GUI).

In the illustrated embodiment, additional details are further shown regarding example internal components of the client device 145. In particular, in this example, client device 145 is suitable for performing at least some of the described techniques, such as by executing an embodiment of an Automated Performance Manager (APM) system 140a, as discussed further below. The example device 145 includes one or more hardware central processing unit ("CPU") processors 105, various hardware input/output ("I/O") components 110, storage 120, memory 130 and one or more batteries 107. Illustrated I/O components in this example embodiment include a display 111 (to provide the visual display area 145a and 145b), a network connection interface 112, a computer-readable media drive 113, and other I/O devices 115 (e.g., wireless or attached keyboards, mice or other pointing devices, microphones, speakers, cameras, other sensors, etc.). Other types of hardware components may additionally be present (e.g., one or more IMUs, or inertial measurement units; other processors, such as a GPU, or graphics processing unit; etc.), but are not illustrated in this example.

An optional server computing system 100 and one or more other network-accessible computing systems 180 are also illustrated, and may each have internal components similar to those of client device 145, although corresponding details are not illustrated in this example for the sake of brevity. In embodiments in which the device 145 includes wireless communications capabilities (e.g., Wi-Fi, a cellular connection, Bluetooth, etc.), the device 145 may communicate with some or all of the other computing systems 100 and 180 over one or more intervening networks 190 via communications 161 with one or more network access points 163 (e.g., Wi-Fi routers, cellular towers and/or base stations, etc.), such as to perform further interactions 162 with the server computing system 100 (e.g., to provide information about performance of the device 145) and/or with the other computing systems 180. In other embodiments, such interactions may instead occur in manners other than via wireless communications, such as to perform such interactions at a later time via a wired or cabled connection (e.g., if the client computing system 145 does not include wireless communications, and/or if the optional APM System 140*b* on server computing system 100 later performs its analysis in an offline or batch mode).

In the illustrated example, one or more embodiments of the APM System 140 may be in use to perform some or all of the described techniques, such as an APM System copy 140*a* that is executing in memory 130 of the client device 145, and/or an APM System copy 140*b* on server computing system 100. The APM system 140*a* and/or 140*b* may automatically and dynamically modify ongoing operation of the client device 145, such as in a real time or near-real time manner, including to perform one or more selected modification actions on the client device 145 (and/or on other devices with which the client device 145 interacts). As discussed in greater detail elsewhere, such modification actions may be performed to improve operations of the client device 145 in one or more manners with respect to one or more types of performance measures and to produce corresponding performance effects, including in some cases to modify one or more stored configuration settings 125 that affect ongoing operations, and may be selected via use of one or more stored APM decision structures 127 that were previously generated. Such modification actions may include, for example, one or more of the following: to change use of an optional buffer area 142 of the memory (e.g., used to temporarily store information being streamed to the client device, such as to enable or disable use of the buffer area, to increase or decrease the size of the buffer area, etc.), such as to reduce errors or problems related to inter-device communications and/or to improve battery use; to change use of optional virtualization on the client device (e.g., used to provide one or more virtual machines 143 that each simulates a physical machine for use in executing one or more programs separately from other programs, such as to enable or disable use of the virtual machine(s), to increase or decrease the size and/or quantity of the virtual machine(s), etc.), such as to improve performance of the CPU(s), storage, memory, battery, etc.; to change execution of one or more optional other programs 135*a* (e.g., to start, stop or modify execution of one or more such other programs, including to change associated priorities of the other programs), such as to improve performance of the CPU(s), storage, memory, and/or battery; etc. Additional details related to generation and use of such decision structures are included elsewhere herein, including with respect to the examples of FIGS. 2A-2E.

In at least some embodiments in which a copy of the APM system executes on a client device such as client device 145, that APM system may operate to improve operations of that client device in a manner specific to that client device. In other embodiments in which a copy of the APM System 140 executes on one of the other computing systems, such as APM System 140*b* on server computing system 100, the APM System 140*b* may interact with numerous client devices (e.g., client devices of some or all of users 105*a*-105*n*) to improve operations on each of those client devices in a device-specific manner, with the number of client devices possibly being in the millions, tens of millions, hundreds of millions, etc. Such an optional server computing system 100 may further execute one or more optional other programs 135*b*, such as to provide information to or otherwise interact with the client devices of the users 105. In addition, modification actions that are performed by one or more APM systems for one or more client devices may further change operations on other devices that interact with or otherwise affect those client devices, such as on one or more network access points 163, server computing system 100 and/or other computing systems 180 (e.g., to change priority of packets or other communications being sent to and/or from those client devices, or to otherwise alter how and when such communications are handled). Additional details regarding operations of embodiments of the APM System are included below.

It will be appreciated that the illustrated computing systems and devices are merely illustrative and are not intended to limit the scope of the present invention. For example, network 190 may include portions of the Internet, a private network (e.g., a corporate network), a cellular network, or any other networks, including combinations of one or more such networks. In addition, computing system 100 and/or client device 145 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers, embedded computers, specialized hardware such as ASICs ("application-specific integrated circuits") or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 140 and/or its components may include executable software instructions and/or data structures in at least some embodiments, which when loaded on and/or executed by particular computing systems or devices may be used to program or otherwise configure those systems or devices, such as to configure hardware processors of those systems or devices. Alternatively, in other embodiments, some or all of the software components and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system components may in some embodiments be combined in fewer components or distributed in additional components. Similarly, in some embodiments the functionality of some of the illustrated components may not be provided and/or other additional functionality may be available.

Thus, in at least some embodiments, the illustrated components and/or systems are software-based components/systems including software instructions that, when executed by the CPU(s) 105 and/or CPU(s) of system 100 and/or other hardware processor means, program the processor(s) to automatically perform the described operations for that component/system, including to use and execute routines and other algorithms as described herein. Furthermore, in some embodiments, some or all of the components and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIGS. 2A-2E are diagrams illustrating examples of generating and using a decision structure for dynamically and automatically modifying ongoing operation of computing devices in device-specific manners.

Figure 2A:
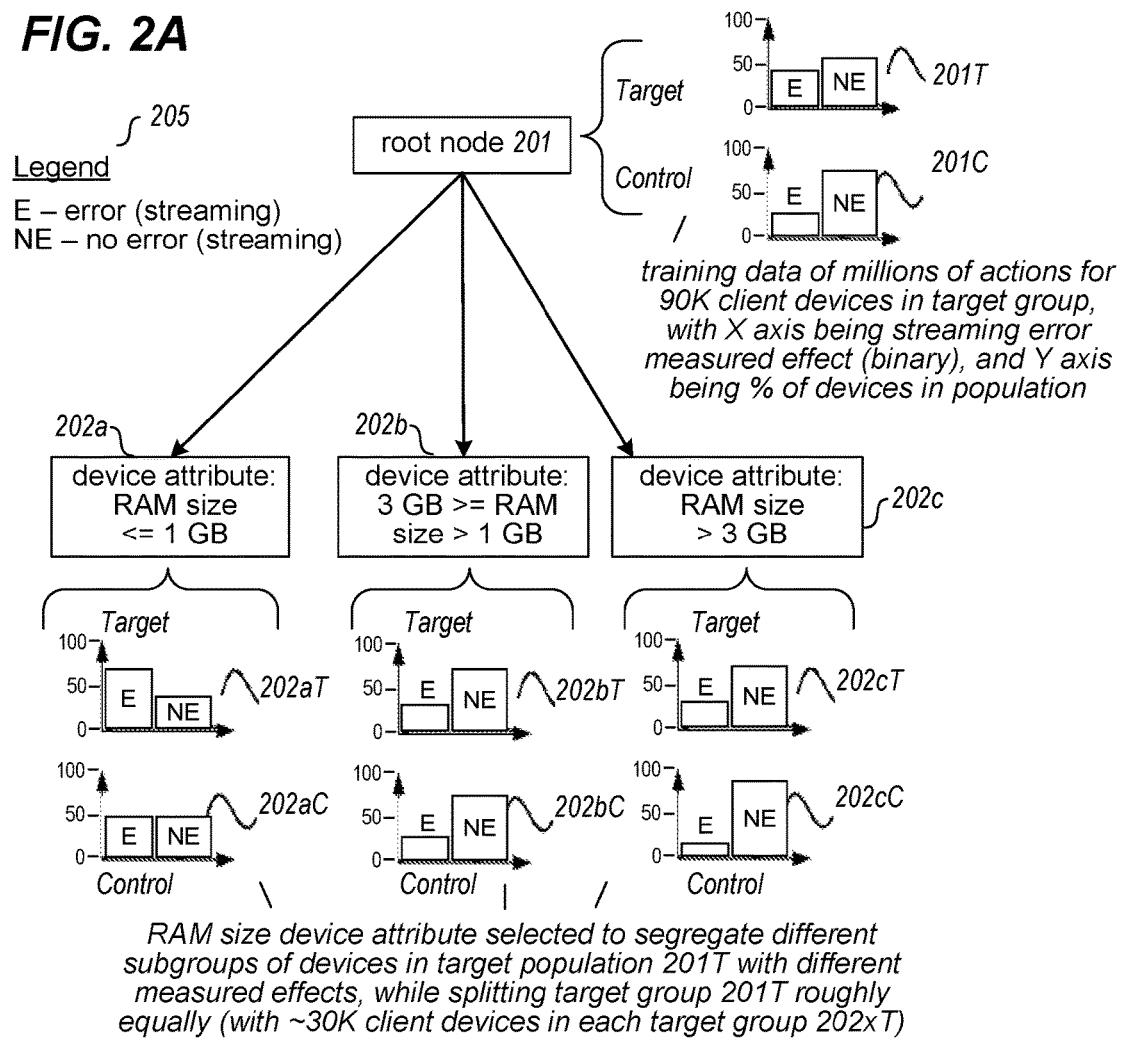

FIG. 2A illustrates an example of beginning the generation of a decision structure for use in representing a measured performance effect of an indicated type, which in this example involves reducing or eliminating errors in streaming information to a client device. In the illustrated example, several nodes 201 and 202 are illustrated, which each includes associated information of one or more types, and a legend 205 is also present to indicate information about data associated with the various nodes. In particular, in the illustrated example, training data has been obtained that represents millions of modification actions performed for a large group of 90,000 client devices, which are part of a target group for which the information in the training data will be used to generate the decision structure, and with the decision structure later used to modify ongoing operations of other client devices to improve their operations related to reducing or eliminating streaming errors on those other client devices.

The generation of the decision structure begins in this example with the creation of a root node 201, with information stored in a manner associated with the root node that includes a target distribution 201T and a control distribution 201C. In the illustrated example, the target distribution 201T represents the training data for the 90,000 client devices, and indicates corresponding subsets of those 90,000 client devices that have streaming errors or do not have streaming errors, which in this example is illustrated with two data points along the x axis of the target distribution, and with the y axis representing the percent of devices in the population, with approximately 45% of the 90,000 client devices having the associated streaming errors and approximately 55% of the 90,000 client devices in the target group not having streaming errors. It will be appreciated that in other embodiments the effect being measured may have forms other than a two-value distribution, such as to have multiple discrete values, have a continuous distribution, etc. In addition to the target distribution 201T, the control distribution 201C indicates data for other devices for which the modification actions were not performed in the training data, with the percentage of devices in the control group with streaming errors being approximately 25% and the percentage of client devices in the control group without streaming errors being approximately 75%.

In order to further generate the decision structure, an analysis is performed on the training data associated with the root node 201 (which includes all of the training data) in order to identify a device attribute or modification action attribute that provides the largest information gain in separating the target distribution 201T into different subgroups with different associated performance effects. In this example, a device attribute is chosen based on the automated analysis that corresponds to the amount of RAM on the client device, and with three child nodes 202*a*, 202*b* and 202*c* created to each correspond to one of three possible values used for the RAM size device attribute. In addition to creating the child nodes 202, the target distribution 201T and its associated 90,000 client devices are separated into three subsets that correspond to each of the three device attribute values. For example, with respect to child node 202*a* whose RAM size device attribute reflects client devices with less than or equal to one gigabyte of memory, a corresponding target distribution 202*a*T is created of client devices that match that device attribute value, and which in this example includes approximately 30,000 of the client devices (or one-third of the original 90,000 devices). Similarly, child nodes 202*b* and 202*c* each also have a subset of the target distribution 201T and the corresponding original 90,000 devices, which in this case are illustrated as target distributions 202*b*T and 202*c*T, respectively.

In this example, the separation of child node 202*a* from the other child nodes creates a significant difference in the performance effects associated with the streaming errors, with the target distribution 202*a*T of child node 202*a* showing approximately 75% of the client devices in the subgroup for that child node having streaming errors, while the remaining client devices in that target distribution subset do not. Conversely, the target distributions of the other child nodes 202*b* and 202*c* are similar to each other, and each reflect a subset of client devices that have approximately 30% to 35% with streaming errors and the remainder not having streaming errors. In this manner, the selected device attribute effectively separates out a subset of the initial 90,000 client devices that have a greater percentage of streaming errors in the target distribution 202*a*T of child node 202*a*, corresponding to client devices with less than or equal to 1 GB of RAM. In a manner similar to that for the target distributions and corresponding original 90,000 devices, the control distribution 201C for root node 201 is separated into three control sub-distributions for client devices in the control group that match the device attribute values for the three child nodes 202*a-c*, as shown with control distributions 202*a*C, 202*b*C and 202*c*C, respectively.

Figure 2B:
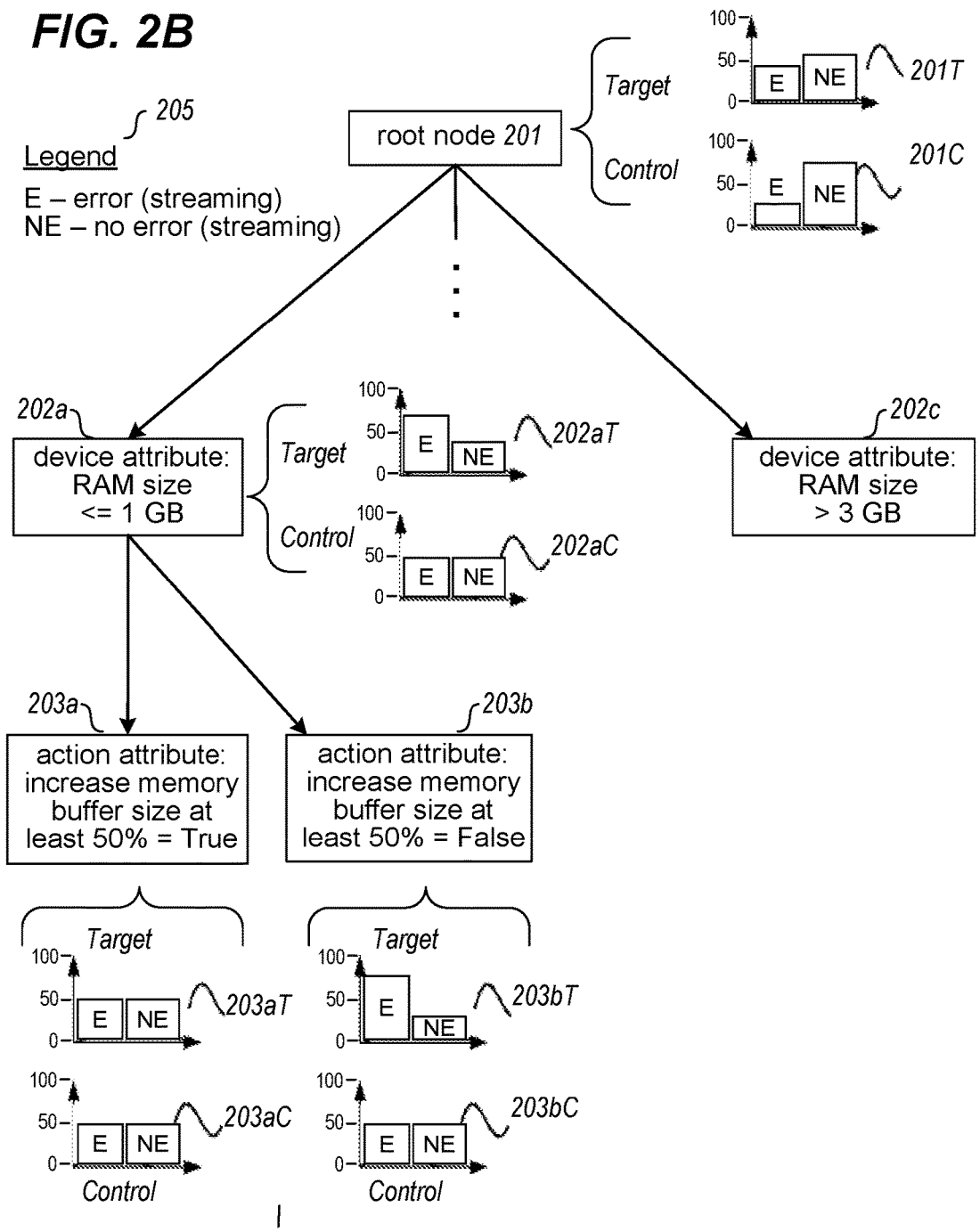

FIG. 2B continues the example of FIG. 2A, and shows further generation of the decision structure initiated in FIG. 2A. In particular, the information of FIG. 2B includes the root node 201 and the first level child nodes 202*a* and 202*c*

(child node 202*b* is not shown), and further illustrates how a second level of child nodes 203*a* and 203*b* are created for the child node 202*a*. In particular, in a manner similar to that previously performed for the root node 201, the subset of the initial training data that is associated with the child node 202*a* and is represented by the target distribution 202*a*T, respectively, is analyzed in order to identify a next device attribute or modification action attribute that provides the most information gain with respect to separating that target distribution 202*a*T into additional subsets with different performance effects. In this example, a modification action attribute is selected corresponding to increasing the memory buffer size on the client device, with two values being shown for the second level client nodes 203*a* and 203*b* corresponding to a size of the memory buffer increase of at least 50% being performed or not. Each of the child nodes 203*a-b* similarly includes a subset of the devices and training data corresponding to the target and control distributions 202*a*T and 202*a*C of the parent node 202*a*, as illustrated in the target and control distributions 203*a*T and 203*a*C for child node 203*a*, and 203*b*T and 203*b*C for child node 203*b*. In this example, the approximately 30,000 client devices associated with the target distribution 202*a*T are split approximately equally between the two new target sub-distributions 203*a*T and 203*b*T, such that each of the child nodes 203*a* and 203*b* represents approximately 15,000 client devices for their respective target distributions and their associated training data, with the control distribution 202*a*C of parent node 202*a* similarly separated into control sub-distributions 203*a*C and 203*b*C for child nodes 203*a* and 203*b*, respectively.

FIG. 2C continues the example of FIGS. 2A and 2B, including to illustrate the root node 201, first level child nodes 202*a* and 202*c* (child node 202*b* is not shown), and second level child nodes 203*a-b* for child node 202*a*. In addition, the decision structure continues to be generated in FIG. 2C by performing actions for first level child node 202*c* in a manner similar to that described in FIG. 2B for child node 202*a*. In particular, the target and control distributions 202*c*T and 202*c*C and associated training data for child node 202*c* are analyzed in order to identify another device attribute or modification attribute that best segments the client devices in the target distribution 202*c*T and provides a corresponding information gain, which in this example is selected to be a device attribute based on the size of the network bandwidth available for use by the client device. Accordingly, two further child nodes 204*a* and 204*b* are added to the decision structure in this example as child nodes of 202*c*, and the target distribution 202*c*T of node 202*c* is divided into corresponding target sub-distributions 204*a*T and 204*b*T associated with the new child nodes 204*a* and 204*b*, respectively. Similarly, the control distribution 202*c*C of node 202*c* is separated into two control sub=distributions 204*a*C and 204*b*C for the new child nodes 204*a* and 204*b*, respectively.

The type of decomposition discussed in FIGS. 2B and 2C continues to be performed in the illustrated example until a child node has a number of associated client devices that is below a specified splitting threshold (e.g., 1,000 client devices), after which the child node is not further decomposed into additional sub-nodes with associated target and control distributions. In this manner, possibly millions of combinations of device attributes and modification action attributes are reduced to a small subset of the possible attributes for the decision structure that provide the largest information gain in segmenting the initial target distribution and group of client devices in it, such as to allow a rapid identification of a small number of the possible total attributes that are most relevant given the training data and its corresponding performance effects of the type being represented by the generated decision structure.

Figure 2D:
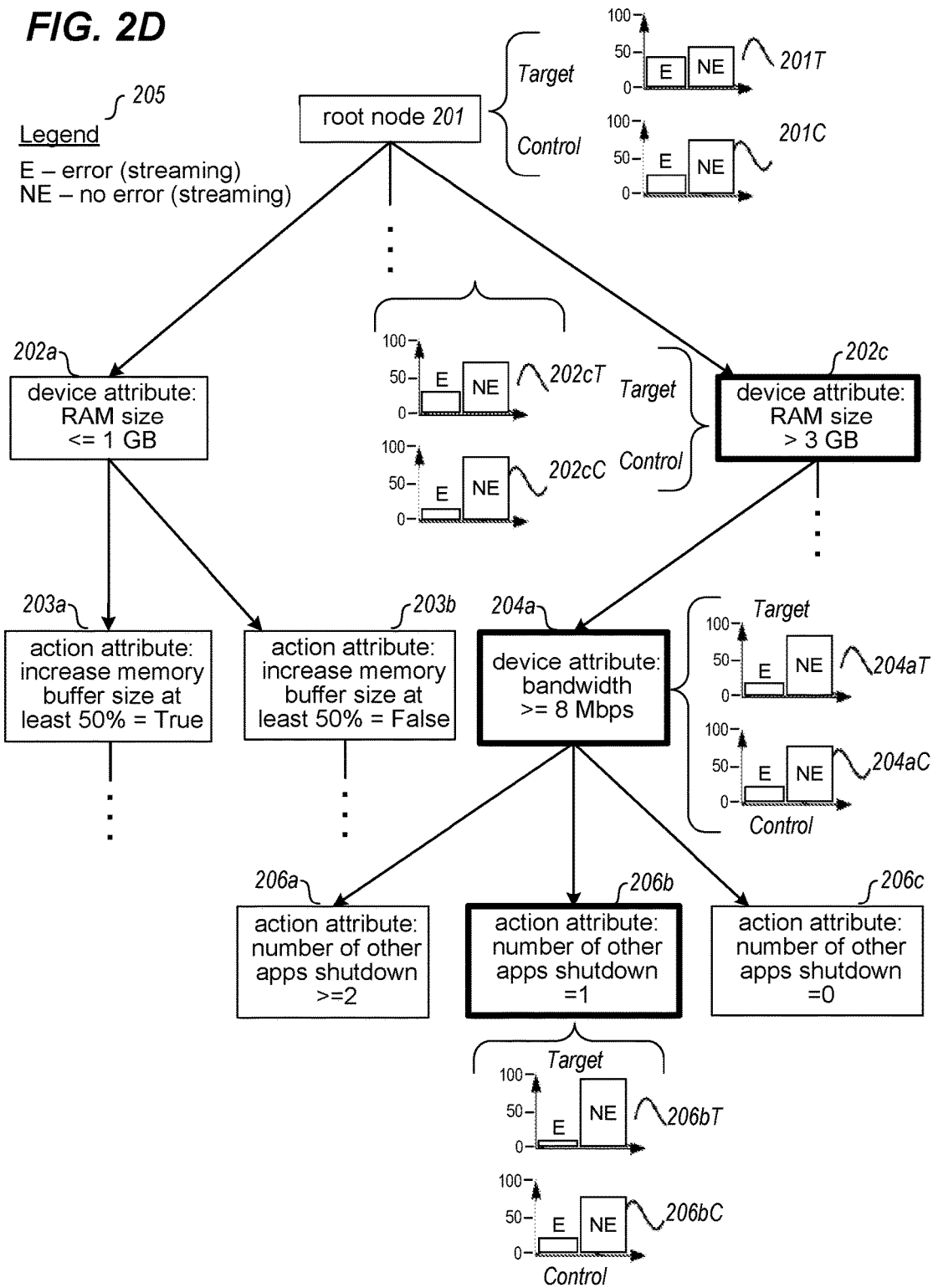

FIG. 2D continues the example of FIGS. 2A-2C, and further illustrates that the second level child node 204*a* has been further segmented during the generation process into three third level child nodes 206*a-c*—it will be appreciated that actual decision structures may include a number of additional levels of child nodes.

In addition, FIG. 2D further illustrates an example of using the generated decision structure after it is completed to improve operation of a corresponding client device (not shown) with respect to reducing or eliminating streaming errors on that client device. In this example, the tree structure of the decision structure is traversed corresponding to attributes of the client device being controlled, which in this example indicates that the client device being controlled has a RAM size greater than 3 gigabytes (corresponding to child node 202*c* being shown in a bolded fashion), a network bandwidth that is greater than or equal to 8 megabits per second (as shown by the bolded child node 204*a* of the initially selected child node 202*c*), and optionally one or more additional device attributes further below the child node 204*a* in the decision structure that are not illustrated in this example.

In addition to the device attributes of the client device being controlled, the use of the decision structure in FIG. 2D includes identifying multiple possible modification actions that may be performed on that client device to control its operations, in considering the attributes of those possible modification actions in the generated decision structure in a manner similar to that of the device attributes. For example, for a first modification action being considered, the action may include shutting down one or more other applications executing on the client device in order to provide additional resources for other uses, with a choice to shutdown one other application corresponding to the bolded additional client node 206*b* of the generated decision structure. One or more other action attributes for that possible modification action may similarly be present in the generated decision structure and further selected below child node 206*b*, but are not shown in this example. If the child node 206*b* instead corresponds to the lowest level child node in the generated decision structure that corresponds to the current client device and possible modification action being considered, then the corresponding target and control distribution information 206*b*T and 206*b*C, respectively, of that child node may be used to predict possible performance effects of performing the possible modification action being considered on the client device. In this example, the target distribution 206*b*T illustrates a very low percentage of approximately 10% of the client devices associated with the child node 206*b* having streaming errors and approximately 90% not having streaming errors after such a modification action is performed, while the control distribution 206*b*C illustrates other percentages of devices in the control group that have streaming errors or do not have streaming errors without such a modification action being performed on them. In this example, the difference between the control and target distributions illustrates that the modification action reduces the number of streaming errors across the client devices in the target group by a relatively significant amount of 10% to 15% of the population.

In at least some embodiments, a prediction is made for the current client device and possible modification action by, for each of the target and control distributions of the child leaf node (or other lowest child node) that is selected, sampling a point in a weighted manner from each distribution, and using the difference between them to determine a likely improvement that would result from performing the possible modification action on the client device. Thus, if such sampling were performed for 100 client devices being controlled, the sampling would result in approximately 10 of the client devices receiving a sample from the target distribution 206$b$T that would correspond to a streaming error still occurring and approximately 90 would receive a result of not having a streaming error, with similar sampling performed in a weighted manner for the control distribution 206$b$C corresponding to its respective percentages.

While not illustrated in this example, a similar analysis would be performed using this generated decision structure for each of the other possible modification actions, and the predicted performance effects resulting from each of the possible modification actions may then be compared in order to select one or more of those possible modification actions that provide the greatest improvement with respect to the performance effect being measured, which in this case would be the greatest chance of reducing the quantity or possibility of streaming errors for the client device being controlled. While also not illustrated with respect to this example, one or more other similar decision structures may be generated for other types of performance effects, such as to have another generated decision structure that measures effects for battery life, and to similarly consider for each of the possible modification actions and the client device being controlled how those possible modification actions would affect the other performance effects for the other generated decision structures. In such an example, different modification actions may be selected for different performance effects, or the results from multiple performance effects and their corresponding decision structures may be combined to select one or more best overall modification actions to perform based on an aggregate benefit of combining the different types of performance effect improvements (e.g., in a weighted manner using system-specified or device-specific weighting).

Figure 2E:
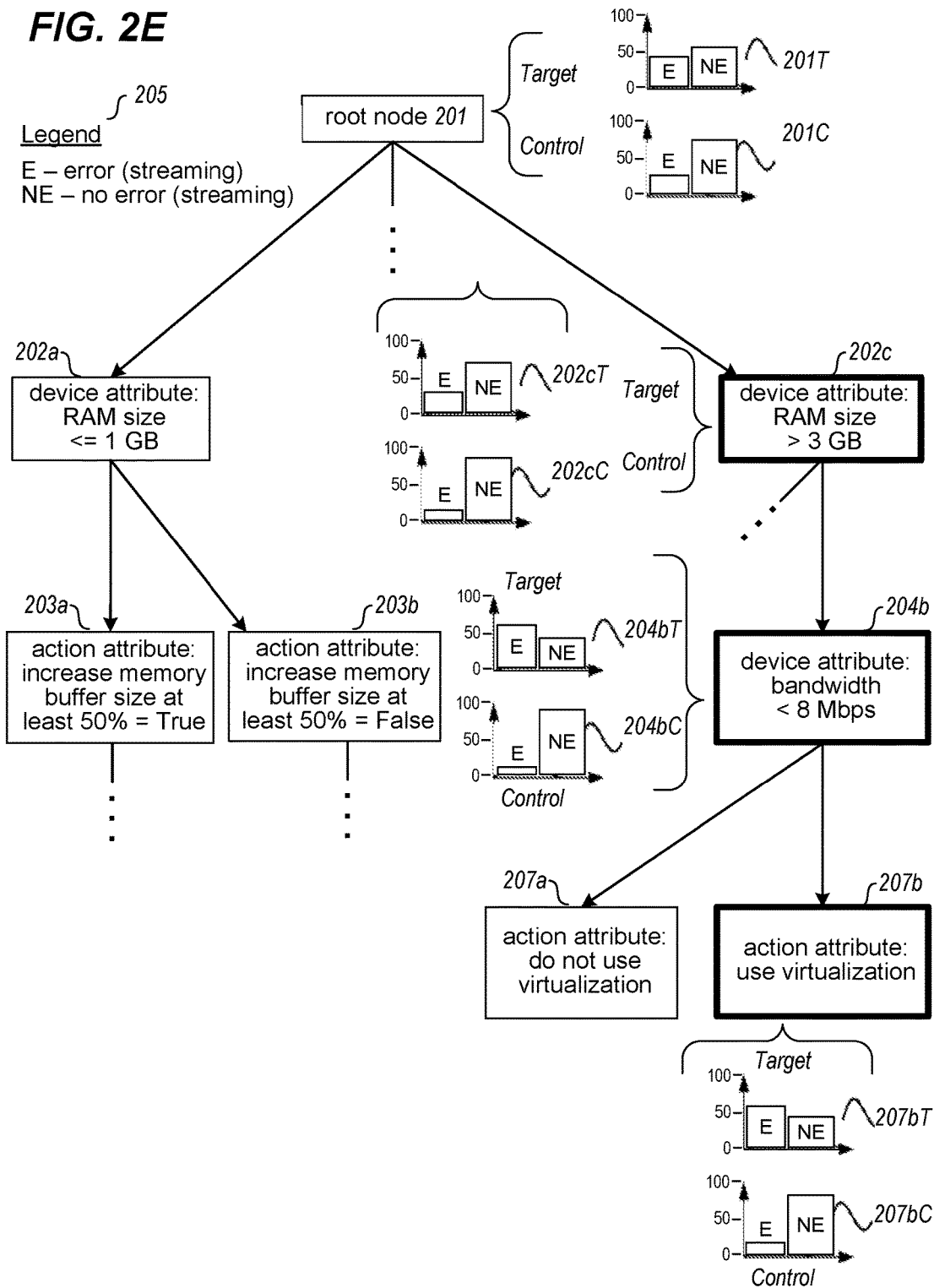

FIG. 2E continues the examples of FIGS. 2A-2D, and in this example illustrates how the same generated decision structure may be used to similarly evaluate possible modification actions for a different client device that has different device attributes. In particular, for the additional second client device (not shown) being analyzed for FIG. 2E, it similarly has over three gigabytes of RAM (as shown by the bolded child node 202$c$), in a manner similar to that of the first client device discussed with respect to FIG. 2D, but the second client device being analyzed in FIG. 2E has network bandwidth that is less than 8 megabits per second (as shown by the bolded further child node 204$b$), in contrast to the first client device discussed with respect to FIG. 2D. In the example illustrated in FIG. 2E, the child node 204$b$ further has two children nodes 207$a$ and 207$b$ that correspond to different values for an action attribute related to the use of virtualization on the client device, such as to use one or more virtual machines. In this example, the possible modification action being considered involves using virtualization (as shown by the bolded child node 207$b$). Accordingly, the target and control distributions 207$b$T and 207$b$C of child node 207$b$ are used in a manner similar to that discussed in FIG. 2D to predict the change in performance effects for the second client device if the possible modification action is performed. In this example, the target distribution 207$b$T has a higher percentage of associated client devices with streaming errors than does the control group, as shown in distribution 207$b$C, reflecting that the possible modification action involving the use of virtualization may not improve their performance with respect to streaming errors for the second client device.

While a limited number of attributes and nodes are shown with respect to FIGS. 2A-2E, it will be appreciated that decision structures in other embodiments and situations may have much larger numbers of nodes and may use other types of device and action attributes, as well as to store and represent associated target and control distribution information in other manners. Furthermore, while various details are provided in the examples of FIGS. 2A-2E, the described techniques are not limited to these example details.

Figure 3:
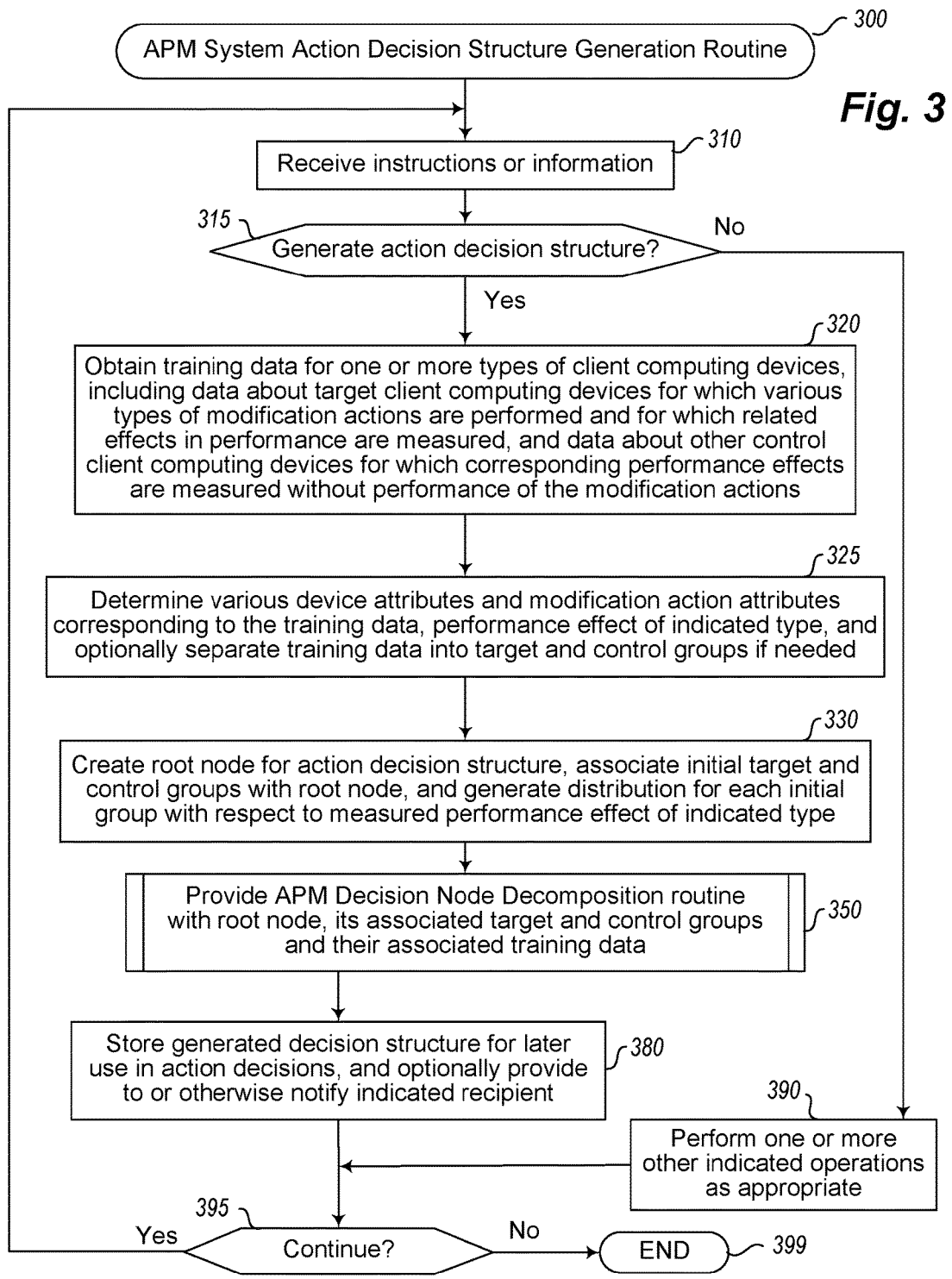
FIG. 3 illustrates a flow diagram of an example embodiment of an Automated Performance Manager (APM) System Action Decision Structure Generation routine.

FIG. 3 illustrates a flow diagram of an example embodiment of an Automated Performance Manager (APM) System Action Decision Structure Generation routine 300. The routine may be performed by, for example, execution of the APM System 140$a$ and/or APM System 140$b$ of FIG. 1 and/or a system used to perform the techniques described with respect to FIGS. 2A-2E or as is elsewhere discussed in the document. While the illustrated embodiment of the routine corresponds to generating a single decision structure for a single type of performance effect, it will be appreciated that in other situations and embodiments the routine may operate in other manners, including to generate multiple decision structures for multiple types of performance effects for a group of client devices for which training available information is available, may generate a single decision structure with multiple types of performance effect information (e.g., to have multiple target and control distributions for each node that correspond to different types of performance effects), etc.

In the illustrated embodiment, the routine begins at block 310, where instructions or information are received. The routine continues to block 315 to determine if the instructions or information received in block 310 are to generate a new action decision structure, and if so continues to block 320. In block 320, training data is obtained for one or more types of client computing devices, including data about particular client computing devices for which various types of modifications are performed and for which related effects in performance are measured, and data about other control group client computing devices for which corresponding performance effects are measured without such modification actions being performed. Such training data may be initially received in block 310, or instead the routine in block 320 may retrieve stored information or otherwise interact with one or more other computing systems from which such training data is available. After block 320, the routine continues to block 325 to determine the various device attributes and modification action attributes that correspond to the client devices and modification actions represented in the training data, as well as to receive information about or otherwise select a type of performance effect for which the decision structure to be generated will represent, as well as to optionally separate the training data into data for the target and control groups if it is not already received in that format. As noted above, in other embodiments the analysis could optionally be performed for multiple types of performance effects, such as to create one or more corresponding decision structures for each such performance effect. In block 330, the routine then creates the root node for the action decision structure being generated, associates the initial target and control groups and the associated training data with the root node, and generates a distribution for each of the target and control groups with respect to the measured performance effect of the indicated type.

After block 330, the routine continues to block 350 to call an APM Decision Node Decomposition routine to decompose the root node and its associated data into child nodes with subgroups of client devices as appropriate, including providing information to the routine about the root node, its associated target and control groups, and the training data associated with them. One example of such an APM Decision Node Decomposition routine is illustrated with respect to FIG. 4. As further discussed with respect to FIG. 4, the routine will continue to recursively decompose the nodes of the decision structure until specified limits are reached to cause the node decomposition to stop, such as if the quantity of client devices in the target distribution for a node is below a splitting threshold. After block 350, the routine in block 380 receives the results of block 350, which is the fully generated decision structure for the indicated type of performance effect, and stores the generated decision structure for later use in performing action decisions for other client devices—the routine may further optionally provide the generated data decision structure to one or more indicated recipients or otherwise notify one or more other entities of the availability of the decision structure.

If it is instead determined in block 315 that the instructions or information received in block 310 are not to generate a new action decision structure, the routine continues instead to block 390 to perform one or more other indicated operations as appropriate. Such other operations may include, for example, modifying or adapting a previously generated decision structure based on new training data, such as to adjust the target and control distributions without altering the node structure, or to instead change the node structure of the decision structure if appropriate. In addition, other types of indicated operations may include receiving and responding to various types of requests, such as a request to provide a generated decision structure or information about it to one or more requestors.

After blocks 380 or 390, the routine continues to block 395 to determine whether to continue, such as until an explicit indication to terminate is received. If it is determined to continue, the routine returns to block 310, and otherwise continues to block 399 and ends.

Figure 4:
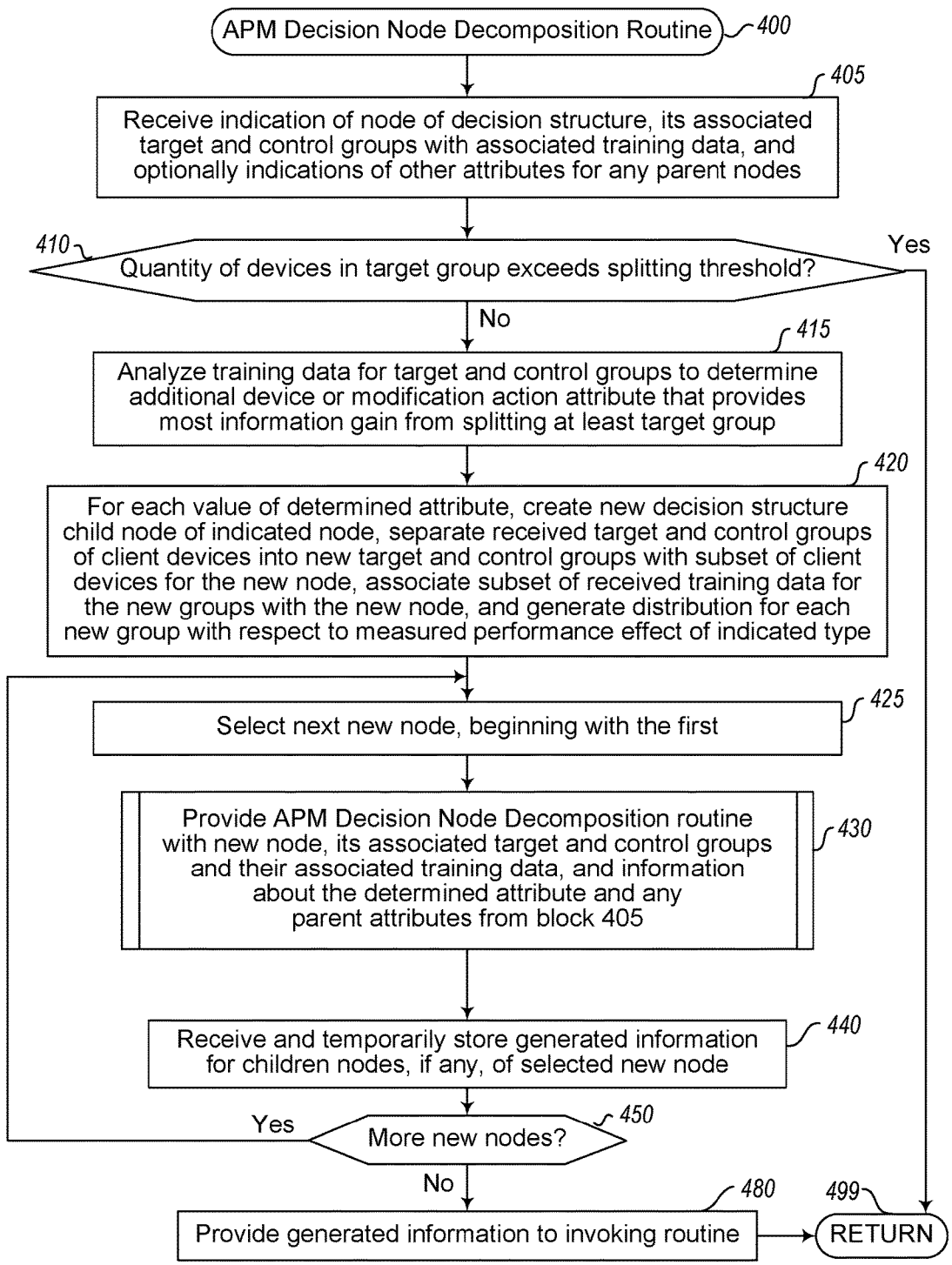
FIG. 4 illustrates a flow diagram of an example embodiment of an APM Decision Node Decomposition routine.

FIG. 4 is a flow diagram of an example embodiment of an APM Decision Node Decomposition routine 400. The routine may be initiated in various manners, including as indicated in block 350 of routine 300 of FIG. 3, and recursively as indicated in block 430 of routine 400 of FIG. 4.

In the illustrated embodiment, the routine begins at block 405, where a node of a decision structure is received, along with associated information that includes the target and control groups and their associated training data for the node, and optionally information about other attributes for any parent nodes in the decision structure that have already been used for those parent nodes (e.g., to prevent the same attribute from being used multiple times along any given path from a leaf node to the root node in at least some embodiments and situations, although attributes may be reused with different values in some situations, as discussed further below). The routine then continues to block 410 to determine if the quantity of devices in the target group for the indicated node exceeds a defined splitting threshold, and if so continues to block 499, and returns without performing further node decomposition. Otherwise, the routine continues to block 415 where operations are performed to analyze the training data for the target and control groups to determine an additional device attribute or modification action attribute to use to split the group of client devices in the associated training data for the target group in a manner that provides the most information gain from the split of the node indicated in block 405. The routine then continues to block 420 and, for each value of the new attribute determined to be used, creates a new child node in the decision structure below the node received in block 405, and generates corresponding target and control distributions and groups of client devices for each of the new child nodes by separating, with respect to the corresponding attribute values of the new determined attribute, the target and control groups and distributions of the node received in block 405. After the target and control groups and distributions are created for each of the new child nodes, they are associated with their respective new child node along with the corresponding training data.

After block 420, the routine continues to perform a loop of blocks 425 through 450 for each new child node that has been created in block 420, including to select the next new child node in block 425, beginning with the first. After block 425, the routine continues to block 430 to recursively call the routine 400 for the new child node, so that it may similarly be decomposed into further child nodes as appropriate, including to pass information to the routine about the new child node, its associated target and control groups and their associated training data, as well as information about the determined attribute used for the child node and any attribute information received in block 405 with respect to parent nodes. The results of the invocation of the routine 430 for a child node will be a completed substructure of the decision structure for all nodes below the child node that is passed to the routine—accordingly, the routine in block 440 receives and temporarily stores the generated information for the substructure of the new child node selected in block 425, if any. After block 440, the routine continues to block 450 to determine if there are more new child nodes created in block 420, and if so returns to block 425 to select the next such new child node. Otherwise, the routine continues to block 480 to provide information about the generated substructure for the node indicated in block 405 to a requestor (including the information temporarily stored in block 440 for each new child node created in block 420), such as to the routine from which it was invoked. After block 480, the routine continues to block 499 and returns.

Figure 5:
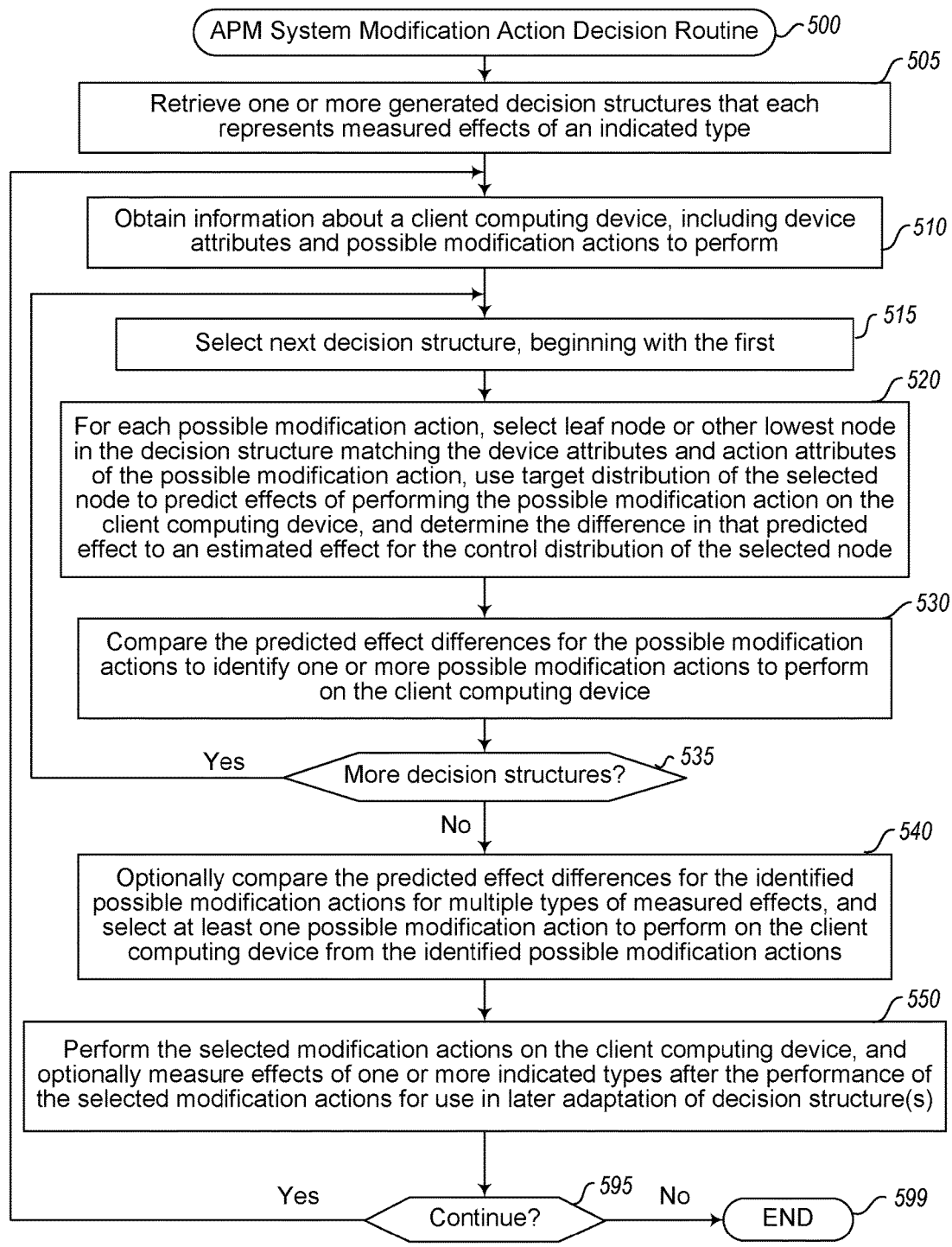
FIG. 5 illustrates a flow diagram of an example embodiment of an APM System Modification Action Decision routine.

FIG. 5 illustrates a flow diagram of an example embodiment of an APM System Modification Action Decision routine 500. The routine may be provided by, for example, execution of the APM System 140a and/or APM System 140b of FIG. 1, and/or a system used to perform the techniques described with respect to FIGS. 2A-2E or elsewhere as described herein. While the illustrated embodiment of the routine is performed with respect to a single client device, in other embodiments it may further be performed for multiple client devices.

The illustrated embodiment of the routine begins at block 505, where one or more generated decision structures are retrieved that each represents measured effects of an indicated type. The routine then continues to block 510 to obtain information about a client computing device being controlled and for which one or more modification actions may be performed, including obtaining information about the attributes of the client device and about possible modification actions to perform specific to that device.

The routine then continues to perform a loop of actions of blocks 515 to 535 for each decision structure and associated performance effect, selecting the next decision structure to consider in block 515, beginning with the first. In block 520, the selected decision structure is then used to evaluate multiple possible modification actions by, for each such possible modification action, selecting the leaf node or other lowest node in the selected decision structure that matches the device attributes of the client device and the action attributes of the possible modification action. The target and control distributions of the selected node are then used to predict the effects of performing the possible modification action on the client device, and to determine the difference in that predicted effect if the modification action is performed. In block 530, the predicted effect differences are compared for the multiple possible modification actions, in order to identify one or more possible modification actions to perform on the client device that provide the best device operation improvements for the type of measured effect of the selected decision structure. The routine then continues to block 535 to determine if there are more such decision structures to consider, and if so returns to block 515 to select the next such decision structure.

If it is instead determined in block 535 that there are not more decision structures to analyze, the routine continues instead to block 540 in which, if multiple such decision structures were analyzed, the predicted effect differences for the possible modification actions identified for each such selected decision structure are used to select at least one modification action to perform on the client device. In some embodiments, the comparison may include a weighted comparison in order to select one or more modification actions that provide the best aggregate improvement in device operations for multiple types of measured performance effects, while in other embodiments the analysis of block 540 may include selecting at least one modification action based on each of the types of measured effects individually. After block 540, the routine continues to block 550 to perform the one or more selected modification actions on the client device, such as by modifying configuration settings on the client device and/or on other associated devices that perform actions that affect the performance on the client device, such as by sending communications to and/or from the client device. In addition, the routine at block 550 may optionally measure the effects (whether immediate or over a period of time, such as minutes, or hours, or days, or weeks, or months) on the client device of the performance of one or all of the performed modification actions, such as for use in later adapting or updating the one or more corresponding decision structures to reflect the actual performance effects, to supplement the original training data used (e.g., to compare the actual effects and how they differ from the predicted effects and to make corresponding changes to the decision structures), etc.

After block 550, the routine continues to block 595 to determine whether to continue, such as until an explicit indication to terminate the routine is received. If it is determined to continue, the routine returns to block 510 to obtain information about the next client computing device to control, and otherwise continues to block 599 and ends. While not illustrated, decision structure changes (whether new decision structures and/or changes to existing decision structures) may also be obtained during operation of the routine and used for further analyses of subsequent client device control operations.

As noted above, modification actions performed may include modifying configuration settings affecting use by a client device (e.g., affecting use of one or more of the device's hardware components, operating system functionality, executing programs, etc.). In some embodiments, other modification actions may be represented in a decision structure and performed on a client device being controlled, whether in addition to or instead of such types of modification actions involving modifying configuration settings, such as one or more of the following: to alter content being provided by one or more programs executing on the content device (e.g., to change program settings or other configuration, to change content being provided to the program from an external source, etc.); to alter use of one or more services by the client device (e.g., to increase use of an existing or new service by the client device, such as directly by the client device or instead by a user of the client device; to retain use of an existing service by the client device, such as directly by the client device or instead by a user of the client device; etc.); etc.

In addition, in at least some embodiments, the selection and/or performance of an action to control a client device may be performed in part or in whole in response to a request, such as a request from the client device (or from a user of the client device), from another device interacting with the client device, etc. —in at least some such embodiments, the selection and/or performance of the action may be performed in a real time or near-real time manner or otherwise substantially immediately after the request (e.g., within milliseconds, within a second, within seconds, within minutes, etc.). Furthermore, the selection and/or performance of an action to control a client device may in some embodiments be performed based at least in part on information specific to the client device (including optionally to a user of the client device), such as to customize and/or personalize the action selection and/or performance to the client device (including optionally to the user)—such customization and/or personalization may be performed in various manners, such as to weight the predicted effects from one or more decision structures of one or some or all possible actions to reflect the device-specific information (e.g., to increase or decrease the likelihood of selection of a particular action, to modify how the action is performed, etc.), and such as to use existing device settings or other device-specific information (e.g., preferences specified for the device and/or the device's user) for the weight. In addition, in at least some embodiments, the selection and/or performance of an action to control a client device may occur before or after a corresponding notification is provided (e.g., to the client device, to a user of the client device, to another specified recipient, etc.), including in some embodiments in which the notification is performed before the action is performed to wait to perform the action until a corresponding confirmation or other affirmation of the action is received (e.g., from the device, from the device's user, etc.).

As noted above, a decision structure may be generated and used in various manners, including based on a variety of device and action attributes, and with respect to various measured performance effects. Non-exclusive examples of generating and using decision structures are included below with various details included for exemplary purposes—however, it will be appreciated that the described techniques are not limited to such details unless otherwise indicated.

One embodiment is described of a process for creating a tree decision structure with performance effect distributions on nodes that may be used to perform automated action decisioning. The process begins by selecting a first group of devices to use as a target group. A second group of devices is also selected as a control group. As a general rule, membership in a group is exclusive, in that a device is not in both groups.

In one embodiment, the initial size of each group of devices is selected to avoid an operational difficulty that might arise when decisions are based on very narrow segments of a device population. Thus, it is desirable that the groups are initially selected to be fairly large. For example, many telecommunications service providers may have millions, if not tens of millions of customers that have client devices. Therefore, it may not be unreasonable to create the tree based on initial sample sizes in the millions, and terminating a branch test, as discussed below, when a subset sample size is less than 1000, or so. However, other sizes may also be used, based for example, on a desired confidence level for hypothesis testing (e.g., Type I/Type II errors), or the like.

A set of initial training actions is then selected. The set of action attributes may be selected by varying any of a variety of action attributes that may be of initial interest.

The selected actions may then be taken for the target device group over a period of time. For example, because it might be desirable to see if a time of week is relevant to effects of an action, the action might be taken at different times of a week for the target device group. Other criteria might also be used to determine when and/or how an action is performed for the target device group. It is noted that the control device group does not receive the selected actions. In this way, the effects of receiving the selected actions may be compared to not receiving the selected actions, all other parameters being known to be consistent between the target and control device groups.

At least one performance effect is selected for recording of both the target device group and the control device group as a result of taking the selected actions. In some embodiments a plurality of performance effects may be of interest. Thus, data is collected for the one or more performance effect(s) of interest based on the taking (or not taking) of the actions in the action set. Such data may be collected over a sliding time window. The width or duration of the window may be set based on characteristics of the actions, the performance effect, usage behaviors for the devices, and/or a combination of these or other characteristics. In one embodiment, the width/duration of the window might be one month, and the width/duration slides by one week. However, other values may also be used.

The data collected for the target and control device groups and the performance effect results are next used in training a tree that has branch splits identified as maximizing an information gain for an action/device attribute, each node within the tree further including target and control distributions for a performance effect, as discussed further below.

In some embodiments, an approach is used that is sometimes referred to as A/B testing, hypothesis testing, or split testing, in which randomized tests with two variants, A and B, are performed to determine an impact on some performance effect of a device. As actions and devices have a plurality of attributes, a plurality of evaluations are performed based on the taking of the actions to then create a tree of branch splits based on those attributes (action or device) that indicate a greatest information gain.

Briefly, an information gain $G_n$ at any node n of the tree may be defined as a difference between an overall entropy $H_n(R)$ at the node and an entropy conditioned on a candidate attribute $A_i$ at that node $H_n(R|A)$, or:

$$G_n(A_i)=H_n(R)-H_n(R|A_i),$$

where n=0, 1, 2, . . . N−1; R is the performance effect lift random variable of interest.

The information gain is directed towards measuring how much the overall entropy decreases when it is known that attribute $A_i$ takes on a specific value $A_i=a_{ij}$, or is limited to a given range of values, $A_i \leq a_{ij}$. The information gain therefore measures attribute $A_i$'s contribution to the randomness of the data. If assigning a value or range to $A_i$ decreases the overall entropy the most, then attribute $A_i$ and its split point value $a_{ij}$ should be selected at a given node of the tree. The process described below may then be employed to evaluate the information gain $G_n$ for each candidate attribute to determine split value candidates in creating the tree.

The action and device attributes and performance effect results of the taking of the actions are first received. In one embodiment, each device is uniquely identified, in addition to its device attributes, as being in either in the control group (and not receiving the actions), or in the target group (and having received the actions).

Pre-processing of at least some of the attribute data for the actions and/or devices may next be performed, so as to enable binary testing and computing of conditional entropies. Some attributes might be described as categorical attributes. These attributes might take on discrete values, which can be strings or non-ordinal numerical values. Further, there might not be a single attribute category usable, absent pre-processing, in A/B testing approaches. Pre-processing categorical attributes for possible splits may include the enumeration of the unique values the attribute can take on. For example, for attribute $A_i$, the split evaluations may be based on $\{a_{i1}, a_{i2}, \ldots\}$, where $a_{ij}$ represents values of the attribute $A_i$.

Subsequently, the information gain for each given value $a_{ij}$ of a candidate categorical attribute $A_i$ may be determined as:

$$G_n(a_{ij})=H_n(R)-[w_1H_n(R|A_i=a_{ij})+w_2H_n(R|A_i \neq a_{ij})]$$

where weights $w_1$ and $w_2$ assigned to the entropies are the proportions of samples at node n for which the condition $A_i=a_{ij}$ is true or false (or some other binary values) respectively, so that the expression in the square brackets above is the weighted average entropy due to conditioning attribute $A_i$.

Pre-processing may also be performed for discrete, ordinal attributes that take on discrete numerical values that carry a notion of order. Thus, split points may be determined below based on the natural discrete values of the attribute. However, there are several choices on how to pre-process the attribute data to condition the entropy to compute the information gain. One option might be to ignore ordering and treat discrete, ordinal attributes as categorical attributes. Another approach, shown herein, considers ordering. In this approach, the information gain may be determined as:

$$G_n(a_{ij})=H_n(R)-[w_1H_n(R|A_i \leq a_{ij})+w_2H_n(R|A_i > a_{ij})].$$

Another type of attribute that might be pre-processed includes continuous numerical attributes. These attributes may be able to take on any numerical value. For these attributes, the split points are determined such that the resulting entropy calculations retain discriminative power while being computationally feasible, although exhaustively iterating through all possible values of the attribute may not be used in at least some embodiments.

Several strategies are available for optimal attribute splitting including a non-parametric approach that uses quantiles. The range of possible values taken on by an attribute is divided into quantiles, and each quantile value is then usable as a possible split point. The information gain for this approach is then similar to the above case for discrete, ordinal attributes.

Further, a number of quantiles might be determined using a variety of mechanisms, such as using deciles, semi-deciles, quartiles, or the like. In some instances, a characteristic of a given attribute might indicate a selection of an optimal quantization. In some embodiments, the quantizations might be re-computed at each tree node level. However, in other instances, a fixed quantization might be used based on unsplit attributes.

Next, at least some attributes may be filtered out, or otherwise prioritized based on the testing being conducted, a characteristic of an attribute, or the like. For example, if the tree is being constructed for a particular geographic location, then having an attribute based on other geographic locations might be of little interest. Such an attribute could then be filtered out, thereby reducing the number of attributes to be examined. Other characteristics or criteria might also be used to filter or otherwise prioritize attributes for evaluation.

The remaining attributes and their related performance effect values are then used to create a plurality of attribute vectors with associated performance effect results. The vectors and associated performance effect results are then used to initialize a tree root node with measure distributions for the target device group and for the control device group.

In one embodiment, a target distribution of the performance effect results is created based on all of the devices in the target device group without respect to a given action or device attribute (other than membership in the target device group). The target distribution is then generated based on the percentage of devices having a given performance effect result. In one embodiment, the percentage of devices might represent values along a y-axis, while the performance effect values are plotted along an x-axis. Similarly, a control distribution for the performance effect results may be created based on all devices in the control device group. Thus, the root node for the tree has associated with it two distributions for the performance effect results, one for the target device group, and the other for the control device group.

A determination is next made whether a split criteria is satisfied. This evaluation is directed towards ensuring that a sufficient number of samples are available in both the target device group and the control device group to provide reasonable estimates of parameters usable in computing information gains. In one embodiment, it is desirable to have at least 1000 devices in the target device group and at least 1000 devices in the control device group. However, other values may also be used. In any event, if it is determined that an insufficient number of devices are in the groups for a given node, then tree splitting for this branch is stopped, and the resulting node is deemed a leaf. Thus, in one embodiment, a node having less than the selected minimum sample size (or "splitting threshold") for both device groups will not split further until enough devices fall into that node's targeting container.

Otherwise, if it is determined that a selected minimum sample size for both device groups is satisfied, then the information gains of splits for available attributes are computed. As an initial step, the estimates for parameters of the performance effect distributions for the target and control device groups at the current node are computed, so as to compute the related entropies. This is because such entropies may be modeled as a function of distribution parameters for the performance effect.

For example, distributions for some performance effects may be modeled effectively by Gamma distributions. Gamma distributions may be modeled using a shape parameter k and a scale parameter $\theta$. Any of a variety of approaches may be used to estimate these parameters, including, but not limited to using iterative procedures to estimate k, fit methods, the Choi-Wette method, or the like.

At each leaf node, for each candidate attribute in the action/device attribute vectors and for each attribute split point, the parameters of the conditional Gamma distribution is computed, where the conditional variable may be the candidate split. Furthermore, computations are performed for both the target device group and the control device group, resulting in a set of conditional parameters ($k_t, \theta_t, k_c, \theta_c | a_{ij}$), where subscript "t" indicates parameters from the target device group, and "c" indicates parameters from the control device group.

The contribution to the entropy of the performance effect lift for control and target device groups is then the difference between the performance effect of the target and control groups ($R_t$ and $R_c$, respectively). Since the performance effect results of targets and controls are independent, the entropy of the lift is the weighted sum of the entropies of each group, or:

$$H_n(R)=H_n(R_t-R_c)=w_tH_n(R_t)+w_cH_n(R_c),$$

where the weights $w_t$ and $w_c$ indicate the target/control device group allocation proportions. The entropy of a Gamma random variable has an explicit form of:

$$H_n(R_t)=k_t+\ln \theta_t+\ln \Gamma(k_t)+(1-k_t)\psi(k_t),$$

where $\Gamma(\bullet)$ is the gamma function and $\psi(\bullet)$ is the digamma function. In the same way, $H_f(R_c)$ for the control group can be computed.

The respective conditional entropies $H_n(R_t|a_{ij})$ and $H_n(R_c|a_{ij})$ are computed in the same way, but first the corresponding Gamma parameters are computed from the conditional populations in the candidate sub-nodes, from ($k_t, \theta_t, k_c, \theta_c | A_i=a_{ij}$) and from ($k_t, \theta_t, k_c, \theta_c | A_i \neq a_{ij}$).

A determination is then made at the current node n of the attribute split pair that maximizes the information gain. At a given node n, there will be a total of $N_n = N_{A_1} + N_{A_2} + \ldots N_{A_m}$ information gain values, one for each candidate attribute/split value, where $N_{A_i}$ is the number of possible splits for attribute $A_i$.

The attribute/split combination that corresponds to the maximum gain is then selected as:

$$a^*n = \arg \max_{a_{ij}} G_n(a_{ij}),$$

where the information gain in terms of its target and control components is written as:

$$G_n(a_{ij})=w_t[H_n(R_t)-[w_1H_n(R_t|A_i=a_{ij})+w_2H_n(R_t|A_i\neq a_{ij})]]+w_c[H_n(R_c)-[w_1H_n(R_c|A_i=a_{ij})+w_2H_n(R_c|A_i\neq a_{ij})]],$$

and similarly for ordinal and continuous attributes. If this maximum information gain is negative, however, then a split is not performed on any attribute at all. In that case, the node will become a leaf in the tree. Splits only occur for positive information gains.

While the above works well using a gamma distribution model for some performance effects, this may not be the case for other performance effects. For example, some distributions might be better modeled using Bernoulli distributions, where the rate of actives may be of interest. Parameters for the Bernoulli distributions include actual active base proportions at node n for the target and control device groups, $p_{T_n}, p_{C_n}$, where:

$$p_{T_n} = \frac{T_n^{(active)}}{T_n},$$

-continued $$p_{C_n} = \frac{C_n^{(active)}}{C_n},$$

The binomial parameters conditioned on the attribute split $a_1$ are also similarly calculated.

Similar to the discussions above, with the same recognition about independence of the target and control sample, the entropy for a Bernoulli distribution may be determined as:

$$H_n(BT) = p_{T_n}\log_2 p_{T_n} + (1-p_{T_n})\log_2(1-p_{T_n}).$$

For the control group, and for the conditional entropies, the expressions are identical, and so is the expression for the information gain $G(a_{ij})$, therefore the attribute split that generates the maximum information gain may be selected.

The identified attribute split is then used to update the remaining available attributes in the action/device attribute vectors.

If the attribute split is on a categorical attribute, then that attribute is removed from further consideration on the "true" branch. Along the false branch, it is still considered for further splits. Example: say we have a split on attributeX=12. Then for the "true" branch (where every vector has attributeX=12) there is no need to further consider splits on attributeX there since all vectors have the same value. On the false branch, however (where every vector has attributeX≠12), vectors may have different values for attributeX, so this attribute is still considered for splits.

If the attribute split is on a continuous attribute, then it will still be considered further in both the "true" and "false" branches. Example: say we have a split on attributeY<=40. On the true branch we have only vectors with attributeY<=40, so a further split on attributeY<=20 is possible. On the false branch, we have only vectors with attributeY>40. so a further split on attributeY<=60 is possible.

The tree is then updated with the new node split along with the related distributions for the target and control device groups. The branch is activated for further evaluations.

A determination is then made whether to continue to train/re-train the tree. For example, where no more attributes are available to evaluate for possible branch splitting, then the tree may be considered to be completed. Other criteria might also be included to terminate tree training. In any event, if the tree is not considered to be completed, processing continues to evaluate another node for another possible branch split.

At this juncture, the training of one or more trees may be complete. That is, a different tree might be created for each of a plurality of different performance effects. Moreover, the trees might be re-trained based on any of a variety of criteria, including, but not limited to seeking to include another attribute for a action and/or device, or to take into account changes over time in the response of the performance effect to particular actions.

At any time that a tree is completed, it may be used during a run-time process to determine which action or actions to perform for a particular device. In particular, a set of actions are identified for which each device in a group of one or more devices is eligible. The devices may include at least some of the target/control devices, although it need not. The devices may be selected based on any of a variety of criteria. In some embodiments, the devices might include devices of all customers of a particular telecommunications' service provider, or the like.

In any event, not every device might be eligible for every action in the set of possible actions. For example, an action in the set of actions might be intended for devices with a particular type of hardware configuration or associated service or subscription. Once each action for which a device is eligible to receive has been identified, vectors for actions and device attributes are constructed. In one embodiment, the attributes may be concatenated in a same order as that used for the training vectors. Thus, if a device is eligible for 1000 possible actions, a 1000 action/device attribute vectors may be constructed for that device. Similarly, for each other device, a plurality of action/device attribute vectors are constructed.

It should be noted that for any of a variety of reasons, one or more attributes might be missing. This may arise, for example, where a new attribute is added (e.g., for a new action), where a new set of devices are included with new attributes, or the like. In these instances, then some other actions or devices might not have the new attributes. Several approaches are considered that address this situation. For example, for categorical attributes, a new category of NULL might be treated as any other category. For ordinal attributes, every time a split is evaluated, instead of evaluating only one test, the following tests might be evaluated:

$$A_j a_{ij} \text{ OR } A_j=\text{NULL vs. } A_i > a_{ij},$$

$$A_j \leq a_{ij} \text{ vs. } A_j > a_{ij} \text{ OR } A_j=\text{NULL, and}$$

$$A_j=\text{NULL vs. } A_i \neq \text{NULL}$$

If there are $S_i$ candidate splits for attribute $A_i$, then there are $2*S_i+1$ information gain calculations. While this approach may take longer to train the tree (missing attributes may arise during training of the tree as well as during run-time), conceptually nothing changes, and at each node the split point that produces the maximum information gain may still be selected.

For each attribute vector for each device, the tree with the performance effect of interest is then traversed to generate a rank ordering of actions for the device. When the tree has been traversed to a node within the tree based on matching of attribute values in a device's vector with the tree node values, a random drawing is performed from the target distribution and the control distribution at that node to obtain an expected lift as a difference between the randomly drawn values. This is performed for each action for the device, to generate a listing of sampled expected lifts for each action for which the device is eligible. The actions may then be rank ordered based on the determined sampled lift values for each action. This is performed for each device, and for each action for that device, to generate rank orderings of actions for each device. By selecting randomly from the target and control distributions, it may be possible to generate different rank orderings of actions, and thereby enable an exploration and exploitation approach to performing actions, and thereby potentially improve upon the results for the performance effect of interest.

It should be noted that the above can readily be adapted for situations where there is a desire to blend decisions for performing actions that seek to benefit from several performance effects. For example, the output from sample values for one performance effect PE1 with a percent lift may be normalized to a population percent for another performance effect PE2 rather than the control. That is:

PE1_% Lift (PE1_Target_Treatment_Sample–
  PE1_Control_Treatment_Sample)/Population_PE1

PE2% Lift (PE2_Target_Treatment_Sample−PE2_Control_Treatment_Sample)/Population_PE2

In another embodiment, both trees may be walked to obtain sampled lift percentages, which may be added together in a weighted approach to generate the rank ordered list of actions. One approach for a combined lift is: combined lift=$q_1$ PE1% Lift+$(1-q_1)$PE2% Lift This approach can be extended to many trees, with $\Sigma_i\, q_i=1$.

In any event, the rank ordered list of actions for each device may then be used to selectively perform zero or more actions on or for a device. For example, a threshold value might be used where actions having a determined lift below that threshold might not be performed. In another embodiment, a first (e.g., highest value) action on each list for each device might be performed for that device, independent of its associated lift. Thus, such a trained decision structure tree is traversed for a given action/device (attribute vector), drawing randomly from the performance effect distributions at the appropriate leaf in the tree to determine whether to perform the given action for the given device. While a tree structure is described herein for this example embodiment, other models may also be used. Thus, other embodiments of the techniques described herein may include other models including, but not limited to logistic regression models, neural networks, support vector machine regression models, Gaussian Process models, General Bayesian model, and so forth.

Additional details related to generating and using decision structures, including with respect to other types of devices and/or actions (e.g., sending messages to devices to cause changes in device behavior and/or behavior of users of the devices), are included in U.S. application Ser. No. 15/607,273, filed May 26, 2017 and entitled "Automated Selection Of User/Message Combinations," which is incorporated herein by reference in its entirely, and which is a continuation of U.S. application Ser. No. 14/264,634, filed Apr. 29, 2014. For example, in some embodiments, the terms "networked services provider", "telecommunications", "telecom", "provider", "carrier", and "operator" may be used interchangeably to refer to a provider of any network-based telecommunications media, product, service, content, and/or application, whether inclusive of or independent of the physical transport medium that may be employed by the telecommunications media, products, services, content, and/or application—accordingly, references to "products/services," or the like, are intended to include products, services, content, and/or applications, and is not to be construed as being limited to merely "products and/or services." In addition, in some embodiments, the terms "optimized" and "optimal" refer to a solution that is determined to provide a result that is considered closest to a defined criteria or boundary given one or more constraints to the solution—thus, a solution is considered optimal if it provides the most favorable or desirable result, under some restriction, compared to other determined solutions, with an optimal solution therefore being a solution selected from a set of determined solutions. In addition, in some embodiments, the term "entropy" refers to a degree of randomness or lack of predictability in an effect of an attribute being evaluated, or based on some other action. In addition, in some embodiments, the term "message" refers to a mechanism for transmitting data that may include information about an available choice, which typically is embedded within a message having a variety of attributes (e.g., how the message is presented; when the message is presented; the mechanism in which the available choice is presented, such as based a type of communications network or service; groups or collections of other attributes; a tone of voice; an urgency; etc.). In such embodiments, the available choice may further refer to a networked services provider's product, service, content, and/or application, and may be provided and/or presented using any of a variety of mechanisms (and optionally be independent of the mechanism). In addition, in some embodiments, the term "tree" refers to an undirected graph in which any two vertices are connected by one simple path, such as a binary tree, a ternary tree, or the like, and the term "node" may also refer to a leaf, where a leaf is the special case of a node, having a degree of one. In addition, in some embodiments, the term "feature measure" refers to an outcome or result of an action (or non-action) to be measured and/or affected based on some input. In addition, in some embodiments, the term "user" may be used to refer to an entity that has or is predicted to in the future make a decision regarding a product, service, content, and/or application from another entity, and in some situations may include not just an individual but also businesses, organizations, or the like. In addition, in some embodiments, the terms "target" and "target group" refer to a composition of client devices (and/or their users) that are subjected to some action for which a resulting feature measure is to be observed, and a target group may sometimes be referred to as a "test group," while a "target distribution" then may be a graph or representation of a feature measure result for the target group. In such embodiments, the terms "control" and "control group" may further refer to a composition of users who do not receive the action that the target group is subjected to, with a "control distribution" then being a graph or other representation of the feature measure result for the control group.

For at least some embodiments that rank treatments using models structured as decision trees, each leaf of those trees contains an estimate of the average lift that may be obtained by delivering a category of treatments to a subpopulation of target devices or other targets. The treatment category and target subpopulation are defined by the predicates found along the path from the leaf to the root node of the tree. If we denote those predicates by the symbol a for brevity, the leaf contains an estimate of $E[l|a]$, where l denotes lift. The expectation is estimated from averages over training data comprising past treatment decisions and associated key performance indicator (KPI) measurements. However, the distribution of treatments and target features under which the expectation is taken is not necessarily the same as that observed in the training data. What is of interest is the expected lift of intervening with treatments in a on the population in a, which may differ from the observed lift of those treatments in the training data because of the conditions under which those treatments were decided in the past.

There are two types of correction to apply to the training data to obtain the expected intervention lift. The first correction, referred to herein as "reconditioning," concerns the estimation of lift for each separate treatment in a, referred to at times herein as an experience and denoted with the symbol e. Reconditioning is a method of obtaining estimates of $E[l|a, do(s)]$, in the notation of Judea Pearl's "do calculus." The difference between $E[\ell\, |a, do(e\,)]$, and $E[\ell\, |a, e\,]$ is the difference between the lift obtained by intervening with treatment e under conditions described by a, and the lift observed from past occurrences of treatment e under conditions described by a. The second correction, referred to herein as "uniform experience," captures the idea that when there are several eligible experiences $(e_1\ell, |e_n)$ to choose from that satisfy the same conditions a, the average lift will preferably reflect an equal proportion of decisions for all of those experiences. Thus, E[l|a] will be defined by a uniform combination of E[$\ell$ |a, do($e_1$)], . . . , E[$\ell$ |a, do($e_n$)]. The procedures for both of these corrections are described below.

Some notation is introduced below to explain reconditioning. See Table 1 below for a summary of symbols and the concepts they represent. The term "context" in this setting is simply an arbitrary encoding of information relevant for a decision. So the "preferred context" encodes information about the ranker's preference for a treatment, which can differ from the actual selected experience in a ranker-independent way (such as a randomization component of the selection process). The "eligibility context" encodes the rules used to decide that a particular target is eligible to receive experience e; these are defined a priori by configuration of the system. Finally, "eligibility context set" is the set of eligibility contexts corresponding to all the experiences the target is eligible for.

TABLE 1

Symbol Key

| symbol | description |
| --- | --- |
| u | target attributes |
| e | selected experience (a.k.a. treatment) |
| a | node attributes: predicates over u and e defining tree node |
| l | lift in KPI |
| d | decision date |
| m | ranker model used for selecting the experience |
| $C^p$ | preferred context (encoding of ranker's preference) |
| $C_m^o$ | eligibility context (encoding of eligibility rules for experience e) |
| $\Gamma_m$ | eligibility context set |

With these terms defined, the reconditioning procedure amounts to an implementation of the following equations:

$$E[l \mid a, do(e)] = \sum_{C^p} E[l \mid C^p, a, do(e)] P\{C^p \mid a, do(e)\}$$

$$= \sum_{C^p} E[l \mid C^p, a, e] \frac{P\{C^p, a \mid do(e)\}}{\sum_{C^p} P\{\overline{C^p}, a \mid do(e)\}}$$

$$= \sum_{C^p} E[l \mid C^p, a, e] \frac{P(C^p a, e)}{\sum_{C^p} f(\overline{C^p}, a, e)}$$

$$f(C^p, a, e) = P\{a \mid C^p, e\} P(C^p)$$

Figure 6:
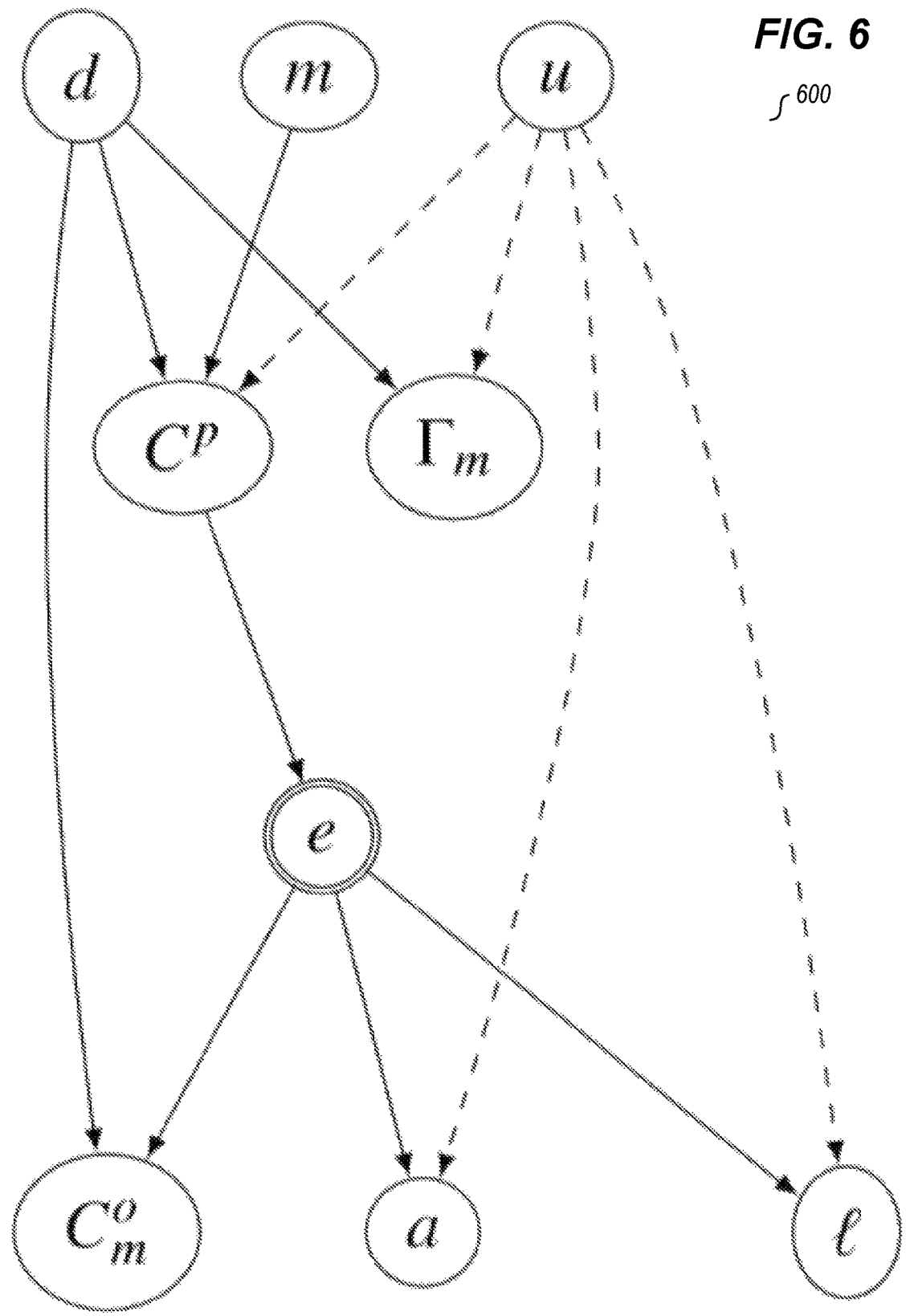
FIG. 6 illustrates an example of a causal dependency of an experience given a specified context.

The basis for these equations is in the do-calculus theory of Pearl (2009), combined with the causal graph model for the decision process expressed in FIG. 6, which indicates in information 600 that $C^P$ is the sole causal parent of e. All quantities involving the causal "do" operator are expressed in terms of ordinary observed probabilities and expectations that can be computed from the available training data.

The uniform experience procedure combines estimates of E[l|a, do(s)], giving equal weight to all eligible experiences. Since different targets satisfying a may have different eligibilities, the average is taken over all eligibility sets. Let E(a,$\Gamma_m$) represent the set of experiences that are enabled by the eligibility contexts in $\Gamma_m$ and meet the conditions of the leaf node a. More precisely, in at least some embodiments, s$\in$E(a,$\Gamma_m$) if and only if there is a target u and an eligibility condition $C_m^a \in \Gamma_m$ such that: $C_m^a$ is an eligibility condition of e, and u satisfies $C_m^a$, and (u,e) satisfies a. The uniform experience procedure then amounts to implementing the following equations:

$$E[l \mid a] = \sum_{\Gamma_m} E[l \mid a, \Gamma_m] P\{\Gamma_m \mid a\}$$

$$E[l \mid a, \Gamma_m] = \sum_{e \in E(a, \Gamma_m)} \frac{1}{|E(a, \Gamma m)|} E[l \mid a, do(e)]$$

Again, all quantities are reduced to terms that are obtained from the data (P[$\Gamma_m$|o) and E(a,$\Gamma_m$)) or estimated from reconditioning (E[l|a, do(s)]).

Those skilled in the art will appreciate that in some embodiments the various described systems and modules may each perform functionality that may be expressed in one or more routines, such as to perform various steps or operations in various manners (e.g., in serial or in parallel, in a synchronous or asynchronous manner, in a particular order, etc.). Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects have been discussed in specific terms such as to be described as processes and/or systems and/or may be presented at times in certain claim forms—the inventors contemplate the various aspects of the invention in any available claim form, including methods, systems, computer-readable mediums on which are stored executable instructions or other contents to cause a method to be performed and/or on which are stored one or more data structures to enable performance of such a method, etc.

What is claimed is:

1. A computer-implemented method comprising:
    tracking, by a configured computing system, device operations of a plurality of mobile devices, including generating data about modification actions of multiple types that are performed on configuration settings affecting use of hardware components on the mobile devices, and about subsequent changes in the device operations of the mobile devices;
    determining, by the configured computing system and based on an automated analysis of the generated data, measured effects on the device operations that result from performing associated modification actions on the configuration settings, wherein the mobile devices have a plurality of device attributes reflecting the hardware components on the mobile devices, and wherein the associated modification actions of the multiple types have a plurality of action attributes reflecting associated configuration setting modifications;
    generating, by the configured computing system, a decision tree structure for a subset of the device and action attributes that are selected based on having associated measured effects of an indicated type, including generating a node in the decision tree structure associated with each of multiple combinations of the device and action attributes of the subset, and storing a target distribution and a control distribution for each node to identify measured effects for devices having the device attributes of the associated combination for the node, wherein the target distribution for a node identifies the measured effects for devices receiving modification actions with the action attributes of the associated combination for the node, and wherein the control distribution for a node identifies the measured effects for other devices that do not receive modification actions with the action attributes of the associated combination for the node; and using, by the configured computing system, the decision tree structure to control ongoing operations for an additional mobile device, including:

determining, by the configured computing system, and for each of multiple modification actions to possibly perform, a node in the decision data structure with an associated combination of device and action attributes that matches attributes of the additional mobile device and the modification action, and using the target and control distributions for the determined node to predict an effect of performing the modification action on the additional mobile device;

selecting, by the configured computing system, one of the multiple modification actions based at least in part on the predicted effect of performing the selected one modification action on the additional mobile device; and performing, by the configured computing system, the selected one modification action on the additional mobile device to modify one or more configuration settings that affect use of hardware components on the additional mobile device.

2. The computer-implemented method of claim 1 further comprising:

measuring, by the configured computing system and after the performing of the selected one modification action on the additional mobile device, actual performance effects on the additional mobile device associated with the selected one modification action; and updating, by the configured computing system, information in the decision tree structure to correspond at least in part to the actual performance effects.

3. The computer-implemented method of claim 1 wherein the using of the target and control distributions for a determined node to predict an effect of performing a modification action on the additional mobile device includes performing a weighted sampling of the measured effects identified in the target distribution to determine a first prediction corresponding to modification action performance, performing a weighted sampling of the measured effects identified in the control distribution to determine a second prediction corresponding to modification action non-performance, and determining the predicted effect of performing the modification action on the additional mobile device as a difference between the first and second predictions.

4. A computer-implemented method comprising:

obtaining, by a configured computing system, a decision data structure generated from data about previous modification actions of multiple types that are performed on configuration settings affecting use of hardware components on mobile devices and that are associated with subsequent changes in device operations of the mobile devices, wherein the mobile devices have a plurality of device attributes and the modification actions have a plurality of action attributes, and wherein the decision data structure includes information about measured effects for a subset of the device and action attributes that are selected based on combinations of those device and action attributes being associated with measured effects of an indicated type in the subsequent changes; and using, by the configured computing system, the decision data structure to control ongoing operations for an additional mobile device, including:

determining, by the configured computing system, and for each of multiple modification actions to possibly perform, one of the combinations of device and action attributes in the decision data structure that matches attributes of the additional mobile device and the modification action, and using information about the measured effects for the determined combination to predict an effect of performing the modification action on the additional mobile device;

selecting, by the configured computing system, one of the multiple modification actions to perform based at least in part on the predicted effect of performing the selected one modification action on the additional mobile device; and initiating, by the configured computing system, performance of the selected one modification action on the additional mobile device to modify one or more configuration settings that affect use of hardware components on the additional mobile device.

5. The computer-implemented method of claim 4 wherein the measured effects for the subset of the device and action attributes are based on performance of batteries powering the mobile devices, wherein the predicted effect of performing the selected one modification action on the additional mobile device involves increasing a length of time that one or more batteries are available to power the additional mobile device, and wherein the initiating of the performance of the selected one modification action on the additional mobile device includes reducing use of one or more hardware components on the additional mobile device that are associated with battery usage.

6. The computer-implemented method of claim 5 wherein the reducing of the use of one or more hardware components on the additional mobile device includes modifying one or more configuration setting on the additional mobile device to reduce use of a display on the additional mobile device.

7. The computer-implemented method of claim 5 wherein the reducing of the use of one or more hardware components on the additional mobile device includes modifying one or more configuration setting on one or more other devices that are associated with managing electronic communications sent to and/or from the additional mobile device to reduce use of a network interface on the additional mobile device.

8. The computer-implemented method of claim 4 wherein the measured effects for the subset of the device and action attributes are based on errors in network communications involving the mobile devices, wherein the predicted effect of performing the selected one modification action on the additional mobile device involves reducing errors of one or more types for network communications involving the additional mobile device, and wherein the initiating of the performance of the selected one modification action on the additional mobile device includes increasing a memory buffer size on the additional mobile device that is associated with streaming data to the additional mobile device.

9. The computer-implemented method of claim 4 wherein the measured effects for the subset of the device and action attributes are based on at least one of processor or memory performance on the mobile devices, wherein the predicted effect of performing the selected one modification action on the additional mobile device involves improving the at least one of processor or memory performance on the additional mobile device, and wherein the initiating of the performance of the selected one modification action on the additional mobile device includes reducing use of virtualization on the additional mobile device.

10. The computer-implemented method of claim 4 wherein the configured computing system is a server system separated from the additional mobile device by one or more computer networks, and wherein the using of the decision data structure to control ongoing operations for an additional mobile device is performed for each of a plurality of additional mobile devices.

11. The computer-implemented method of claim 4 wherein the configured computing system is the additional mobile device, and wherein the using of the decision data structure includes executing an automated performance manager system on the additional mobile device to perform the controlling of the ongoing operations for the additional mobile device.

12. The computer-implemented method of claim 4 further comprising:
obtaining additional decision data structures that each includes information about a type of measured effect for a subset of device and action attributes that are selected for use in that decision data structure, and wherein the type of measured effect for each of the additional decision data structures is different from that for the obtained decision data structure and from other of the additional decision data structures; and
determining, by the configured computing system, and for each of the additional decision data structures, a predicted effect of the type for the additional decision data structure for performing each of the multiple modification actions on the additional mobile device;
and wherein the selecting of the one modification action further includes blending the determined predicted effects from each of the additional decision data structures for the one modification action with the predicted effect from the decision data structure for the one modification action.

13. The computer-implemented method of claim 12 wherein the determining of the predicted effect for each of the additional decision data structures for performing each of the multiple modification actions on the additional mobile device includes identifying one of multiple nodes in the additional decision data structure that is associated with a combination of device and action attributes in the decision data structure that matches attributes of the additional mobile device and that modification action, and wherein the blending of the determined predicted effects from each of the additional decision data structures for the one modification action with the predicted effect from the decision data structure for the one modification action includes weighting the determined predicted effect from each additional decision data structure based at least in part on how similar the device and modification attributes for the identified node in that additional decision data structure for the one modification action are to an intersection of device and modification attributes of all nodes.

14. The computer-implemented method of claim 12 wherein the blending of the determined predicted effects from each of the additional decision data structures for the one modification action with the predicted effect from the decision data structure for the one modification action includes weighting the determined predicted effect from each additional decision data structure to minimize a mean square lift over all of the multiple modification actions for training data used to train the additional decision data structures.

15. The computer-implemented method of claim 4 wherein the using of the decision data structure to control ongoing operations for the additional mobile device further includes receiving, by the configured computing system, a request for a modification action to be performed substantially immediately, and wherein the determining and the using of the information and the selecting and the initiating are performed in response to the received request.

16. The computer-implemented method of claim 4 further comprising notifying, by at least one of the configured computing system or the additional mobile device, and after the performance of the selected one modification action on the additional mobile device, a user of the additional mobile device of the performance of the selected one modification action on the additional mobile device.

17. The computer-implemented method of claim 4 further comprising notifying, by at least one of the configured computing system or the additional mobile device, a user of the additional mobile device of the selected one modification action, and wherein the performance of the selected one modification action on the additional mobile device is further based at least in part on a response of the user to the notifying.

18. The computer-implemented method of claim 4 wherein the selecting of the one modification action is further based in part on additional information specific to the additional mobile device to customize the selecting to the additional mobile device.

19. The computer-implemented method of claim 4 wherein the selecting of the one modification action is further based in part on additional information specific to a user of the additional mobile device to customize the selecting to the user.

20. The computer-implemented method of claim 4 wherein some of the combinations of device and action attributes with information included in the decision data structure have action attributes that further correspond to actions involving modifying content being provided via programs executing on the mobile devices, wherein one or more of the multiple modification actions include modifying content being provided by at least one program executing on the additional mobile device, and wherein the method further comprises selecting and performing at least one of the one or more modification actions to cause content being provided by at least one program executing on the additional mobile device to be modified.

21. The computer-implemented method of claim 4 wherein some of the combinations of device and action attributes with information included in the decision data structure have action attributes that further correspond to actions involving providing choices to increase use of a service by the mobile devices, wherein one or more of the multiple modification actions include providing one or more choices to increase use of the service by the additional mobile device, and wherein the method further comprises selecting and performing at least one of the one or more modification actions to cause the providing of the one or more choices to increase use of the service by the additional mobile device.

22. The computer-implemented method of claim 4 wherein some of the combinations of device and action attributes with information included in the decision data structure have action attributes that further correspond to actions involving providing choices to retain use of a service by the mobile devices, wherein one or more of the multiple modification actions include providing one or more choices to retain use of the service by the additional mobile device, and wherein the method further comprises selecting and performing at least one of the one or more modification actions to cause the providing of the one or more choices to retain use of the service by the additional mobile device.

23. The computer-implemented method of claim 4 wherein the additional mobile device is at least one of a smartphone, a portable gaming device, a tablet computer or a laptop computer.

24. The computer-implemented method of claim 4 wherein the determined one combination of device and action attributes has an associated node in the decision data structure that has a target distribution and a control distribution, wherein the target distribution identifies the measured effects for devices with the device attributes of the determined one combination that receive modification actions with the action attributes of the determined one combination, wherein the control distribution identifies the measured effects for other devices with the device attributes of the determined one combination that do not receive modification actions with the action attributes of the determined one combination, and wherein predicting the effect of performing the modification action on the additional mobile device includes determining a difference in identified measured effects for the target distribution and identified measured effects for the control distribution.

25. The computer-implemented method of claim 4 wherein a quantity of all combinations of the plurality of device attributes and the plurality of action attributes is too large for the decision data structure to include information about measured effects for each of the all combinations, and wherein generating of the decision data structure further includes selecting the device and action attributes of the subset based at least in part on the selected device and action attributes providing an information gain related to correlations with the measured effects that is greater than information gains for other possible device and action attributes that are not selected.

26. A non-transitory computer-readable medium having stored contents that cause one or more computing systems to perform automated operations including at least:
obtaining, by a configured computing system, a decision structure generated from data about previous modification actions of multiple types that are performed on configuration settings affecting use of hardware components on computing devices and that are associated with subsequent changes in device operations of the computing devices, wherein the computing devices and the modification actions have a plurality of device and action attributes, and wherein the decision structure includes information about measured effects for a subset of the device and action attributes that are selected based on combinations of those device and action attributes being associated with measured effects of an indicated type in the subsequent changes; and
using, by the configured computing system, the decision structure to control ongoing operations for an additional computing device, including:
determining, by the configured computing system, and for each of multiple modification actions to possibly perform, a combination of device and action attributes in the decision structure that matches attributes of the additional computing device and the modification action, and using information about the measured effects for the determined combination to predict an effect of performing the modification action on the additional computing device;
selecting, by the configured computing system, one of the multiple modification actions based at least in part on the predicted effect of performing the selected one modification action on the additional computing device; and
initiating, by the configured computing system, performance of the selected one modification action on the additional computing device to modify one or more configuration settings that affect use of hardware components on the additional computing device.

27. The non-transitory computer-readable medium of claim 26 wherein the additional computing device is a mobile device, wherein the decision structure is a decision tree data structure, and wherein the stored contents include software instructions that, when executed, program the one or more computing systems to perform the automated operations.

28. A system comprising:
one or more hardware processors of one or more computing systems; and
one or more memories with stored instructions that, when executed, cause the system to perform automated operations including at least:
obtaining decision information generated from data about previous modification actions of multiple types that are performed on configuration settings affecting use of hardware components on computing devices and that are associated with subsequent changes in device operations of the computing devices, wherein the computing devices and the modification actions have a plurality of device and action attributes, and wherein the decision structure includes information about measured effects for a subset of the device and action attributes that are selected based on combinations of those device and action attributes being associated with measured effects of an indicated type in the subsequent changes; and
using the obtained decision information to control ongoing operations for an additional computing device, including:
determining, for each of multiple modification actions to possibly perform, a combination of device and action attributes in the obtained decision information that matches attributes of the additional computing device and the modification action, and using information about the measured effects for the determined combination to predict an effect of performing the modification action on the additional computing device;
selecting one of the multiple modification actions based at least in part on the predicted effect of performing the selected one modification action on the additional computing device; and initiating performance of the selected one modification action on the additional computing device to modify one or more configuration settings that affect use of hardware components on the additional computing device.

29. The system of claim 28 wherein the additional computing device is a mobile device, wherein the obtained decision information is encoded in a decision tree data structure, and wherein the stored instructions include software instructions that, when executed, program the one or more computing systems to perform the automated operations.

* * * * *